United States Patent
Turner

(10) Patent No.: US 10,157,139 B2
(45) Date of Patent: Dec. 18, 2018

(54) ASYNCHRONOUS CACHE OPERATIONS

(71) Applicant: QUALCOMM Incorporated, San Diego, CA (US)

(72) Inventor: Andrew Edmund Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/268,895

(22) Filed: Sep. 19, 2016

(65) Prior Publication Data

US 2018/0081817 A1 Mar. 22, 2018

(51) Int. Cl.

| G06F 12/00 | (2006.01) |
|---|---|
| *G06F 12/0888* | (2016.01) |
| *G06F 12/0815* | (2016.01) |
| *G06F 12/0808* | (2016.01) |
| G06F 13/00 | (2006.01) |
| G06F 13/28 | (2006.01) |
| G06F 12/0811 | (2016.01) |
| G06F 12/0891 | (2016.01) |

(52) U.S. Cl.
CPC ...... *G06F 12/0888* (2013.01); *G06F 12/0808* (2013.01); *G06F 12/0815* (2013.01); *G06F 12/0811* (2013.01); *G06F 12/0891* (2013.01); *G06F 2212/1024* (2013.01); *G06F 2212/62* (2013.01); *G06F 2212/621* (2013.01)

(58) Field of Classification Search
CPC ............. G06F 12/0888; G06F 12/0815; G06F 2212/62
See application file for complete search history.

(56) References Cited

U.S. PATENT DOCUMENTS

| 5,875,472 | A | * | 2/1999 | Bauman | G06F 12/0815 711/141 |
|---|---|---|---|---|---|
| 6,122,711 | A | * | 9/2000 | Mackenthun | G06F 12/0804 711/119 |
| 6,311,252 | B1 | * | 10/2001 | Raz | G06F 12/0866 711/112 |
| 6,523,098 | B1 | * | 2/2003 | Anderson | G06F 13/161 711/156 |
| 6,868,482 | B1 | | 3/2005 | MacKenthun et al. | |
| 7,263,586 | B1 | | 8/2007 | Kapil | |
| 8,935,485 | B2 | | 1/2015 | Jalal et al. | |

(Continued)

OTHER PUBLICATIONS

International Search Report and Written Opinion—PCT/US2017/047988—ISA/EPO—dated Oct. 10, 2017.

*Primary Examiner* — Mark A Giardino, Jr.
(74) *Attorney, Agent, or Firm* — The Marbury Law Group/Qualcomm

(57) ABSTRACT

Aspects include computing devices, apparatus, and methods implemented by the apparatus for implementing asynchronous cache maintenance operations on a computing device, including activating a first asynchronous cache maintenance operation, determining whether an active address of a memory access request to a cache is in a first range of addresses of the first active asynchronous cache maintenance operation, and queuing the first active asynchronous cache maintenance operation as the first asynchronous cache maintenance operation in a fixup queue in response to determining that the active address is in the first range of addresses.

24 Claims, 13 Drawing Sheets

(56) References Cited

U.S. PATENT DOCUMENTS

| | | |
|---|---|---|
| 2005/0144379 A1* | 6/2005 | Eschmann .......... G06F 12/0804 |
| | | 711/113 |
| 2006/0179223 A1 | 8/2006 | Clark et al. |
| 2008/0301371 A1* | 12/2008 | Peled ................. G06F 12/0804 |
| | | 711/128 |
| 2010/0235579 A1 | 9/2010 | Biles et al. |
| 2011/0314224 A1* | 12/2011 | Piry .......................... G06F 9/52 |
| | | 711/118 |
| 2014/0258637 A1 | 9/2014 | Hong et al. |
| 2014/0317358 A1 | 10/2014 | Meier et al. |
| 2015/0339230 A1 | 11/2015 | Dinkjian et al. |

\* cited by examiner

ASYNCHRONOUS CACHE OPERATIONS

BACKGROUND

Hardware accelerators can be used to help a central processing unit (CPU) process workloads. The workloads often require using data from a CPU cache. To provide the accelerators with the data from the CPU cache, cache maintenance operations need to be implemented. However, cache maintenance operations can have negative impacts on the performance of processing the workloads offloaded to an accelerator. Generally a cache flush maintenance operation must be implemented before an accelerator run, and a cache invalidate maintenance operation must be implemented after the accelerator run. Small workload offloads to accelerators is increasingly important for improving processing performance. These small workload offloads can suffer the most performance degradation from cache maintenance penalties.

SUMMARY

Various disclosed aspects may include apparatuses and methods for implementing asynchronous cache maintenance operations on a computing device. Various aspects may include activating a first asynchronous cache maintenance operation, determining whether an active address of a memory access request to a cache is in a first range of addresses of the first active asynchronous cache maintenance operation, and queuing the first active asynchronous cache maintenance operation as the first asynchronous cache maintenance operation in a fixup queue in response to determining that the active address is in the first range of addresses.

Some aspects may further include determining whether to execute the queued first asynchronous cache maintenance operation, receiving the queued first asynchronous cache maintenance operation from the fixup queue in response to determining to execute the queued first asynchronous cache maintenance operation, activating the first asynchronous cache maintenance operation received from the fixup queue, executing the first active asynchronous cache maintenance operation, and deallocating the first active asynchronous cache maintenance operation upon completion of execution of the first active asynchronous cache maintenance operation.

In some aspects, determining whether to execute the queued first asynchronous cache maintenance operation may include determining whether to execute the queued first asynchronous cache maintenance operation based on one of a elapsed time, an elapsed number of operations implemented on a cache line in the first range of addresses for the queued asynchronous cache maintenance operation, and an idle state of an address for the queued first asynchronous cache maintenance operation.

In some aspects, executing the first active asynchronous cache maintenance operation may include executing the first active asynchronous cache maintenance operation in parallel with execution of a workload offloaded from a processing device having the cache on which the first active asynchronous cache maintenance operation is executing.

Some aspects may further include determining whether a threshold is exceeded for executing the queued first asynchronous cache maintenance operation, converting the queued first asynchronous cache maintenance operation to a synchronous cache maintenance operation, blocking any memory access request for the first range of addresses, and executing the synchronous cache maintenance operation.

In some aspects, queuing the first active asynchronous cache maintenance operation may include storing an asynchronous cache maintenance operation tag and the active address.

Some aspects may further include activating a second asynchronous cache maintenance operation, determining whether the active address of the memory access request to the cache is in a second range of addresses of the second active asynchronous cache maintenance operation, and queuing the second active asynchronous cache maintenance operation as the second asynchronous cache maintenance operation in response to determining that the active address is in the second range of addresses in the fixup queue.

Further aspects include a computing device having a cache, an address range checker, a fixup queue, and a cache operation control unit configured to perform operations of the methods summarized above. Further aspects include a computing device having means for performing functions of the methods summarized above. Further aspects include a non-transitory processor-readable storage medium having stored thereon processor-executable instructions configure to cause a processing device of a computing device to perform operations of the methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

DETAILED DESCRIPTION

Figure 1:
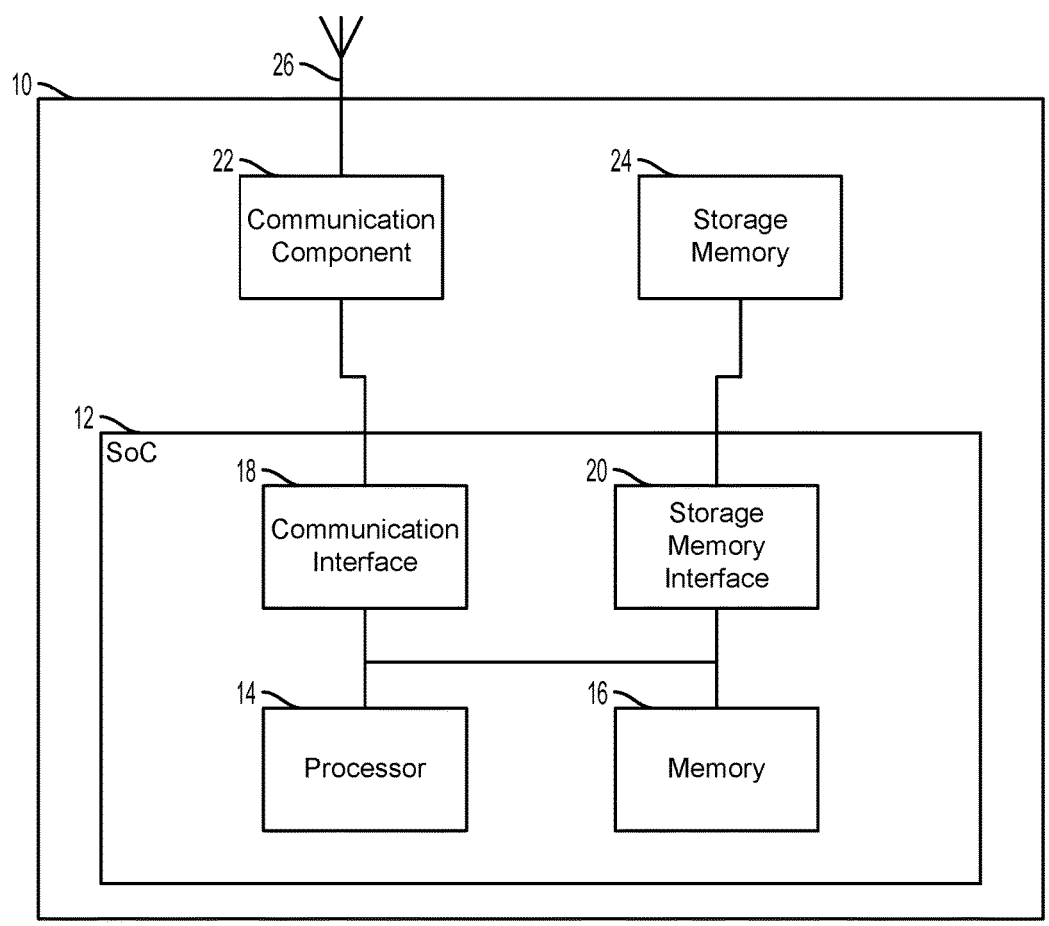
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods, and systems and devices implementing such methods for implementing asynchronous cache maintenance operations that allow cache maintenance operations to be performed at convenient times and while the cache is still in use in order to reduce delay in processing workloads. The multiple processors may be multicore processors. The apparatus and methods of the various aspects may include checking cache memory addresses for asynchronous cache maintenance operations versus active addresses in the cache, placing asynchronous cache maintenance operations matching an active address in the cache in a queue, and implementing the queued asynchronous cache maintenance operations in the queue at convenient times while the cache is still in use.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

A master of a cache memory (e.g., a CPU or a hardware accelerator) may issue a command for an asynchronous cache maintenance operation for designated range of addresses of the cache. A control unit may receive and store up to a first number, "N", of asynchronous cache maintenance operation instructions and associated cache address ranges. The control unit may control implementation of up to a second number, "M", of asynchronous cache maintenance operations concurrently for different cache address ranges. The control unit may activate an asynchronous cache maintenance operation and send an active signal for implementation of the cache maintenance operation to a walker unit. An address range checker may compare up to M cache address ranges of the asynchronous cache maintenance operations with active cache addresses. In response to finding no match between a cache address range for an asynchronous cache maintenance operation and an active cache address, the walker unit may continue to implement the asynchronous cache maintenance operation across the cache address range of the asynchronous cache maintenance operation without any action taken by the control unit. In response to a match of a cache address range for an asynchronous cache maintenance operation and an active cache address, the control may unit send an asynchronous cache maintenance operation tag and the matching address to be queued in a fixup queue.

To implement the asynchronous cache maintenance operation for a cache address range not matching an active address (active asynchronous cache maintenance operations), the walker may receive the active asynchronous cache maintenance operations and the associated address ranges from the control unit. The walker may store and implement up to a third number, "K", of active asynchronous cache maintenance operations. The walker may implement an active asynchronous cache maintenance operation at a convenient time, for example, when the cache or a bank of the cache is idle. The walker may traverse the address range for the active asynchronous cache maintenance operation, and implement the asynchronous cache maintenance operation to the address range of the cache.

The walker may also implement the asynchronous cache maintenance operations delayed because of the address match that are stored in the fixup queue to maintain coherency of the cache. In some aspects, the walker may retrieve an asynchronous cache maintenance operation from the control unit using the asynchronous cache maintenance operation tag from the fixup queue and the associated address from the fixup queue after a given delay. In some aspects, the asynchronous cache maintenance operation tag from the fixup queue may contain code for the cache maintenance operation, and the walker may implement the code for the associated address from the fixup queue after a given delay. The given delay may include an elapsed time or an elapsed number of operations implemented on a relevant cache line in the address range for the asynchronous cache maintenance operation, a count of idle activity to the relevant cache line, or any combination of these factors. The delay may be used to improve cache performance. The walker may implement the active asynchronous cache maintenance operation to the address of the cache from the fixup queue in the cache. The address range checker and the fixup queue enable asynchronous cache maintenance operations to be delayed in parallel, rather than doing the address range checking on a critical path before a cache access. This parallel delay may be implemented so that the master does not detect any latency or timing discrepancies incurred by the delay.

To convert a synchronous cache maintenance operations to synchronous cache maintenance operations, and implement synchronous cache maintenance operations, the master may request blocking the address range on which the asynchronous cache maintenance operation is being implemented. Blocking the address range in the cache may prevent other operations from modifying the address range of the cache. The blocking may be implemented on the entire address range for the asynchronous cache maintenance operation being implemented.

Upon completion of the asynchronous cache maintenance operation for the associated address range, the walker may send a notification of the completion of the asynchronous cache maintenance operation. A first completion notification may be sent to the master to acknowledge completion of the instruction to implement the asynchronous cache maintenance operation sent by the master. Upon completion of an active asynchronous cache maintenance operation, the walker may send a second completion notification to the control unit to indicate completion of the asynchronous cache maintenance operation, prompting the control unit to deallocate the asynchronous cache maintenance operation.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
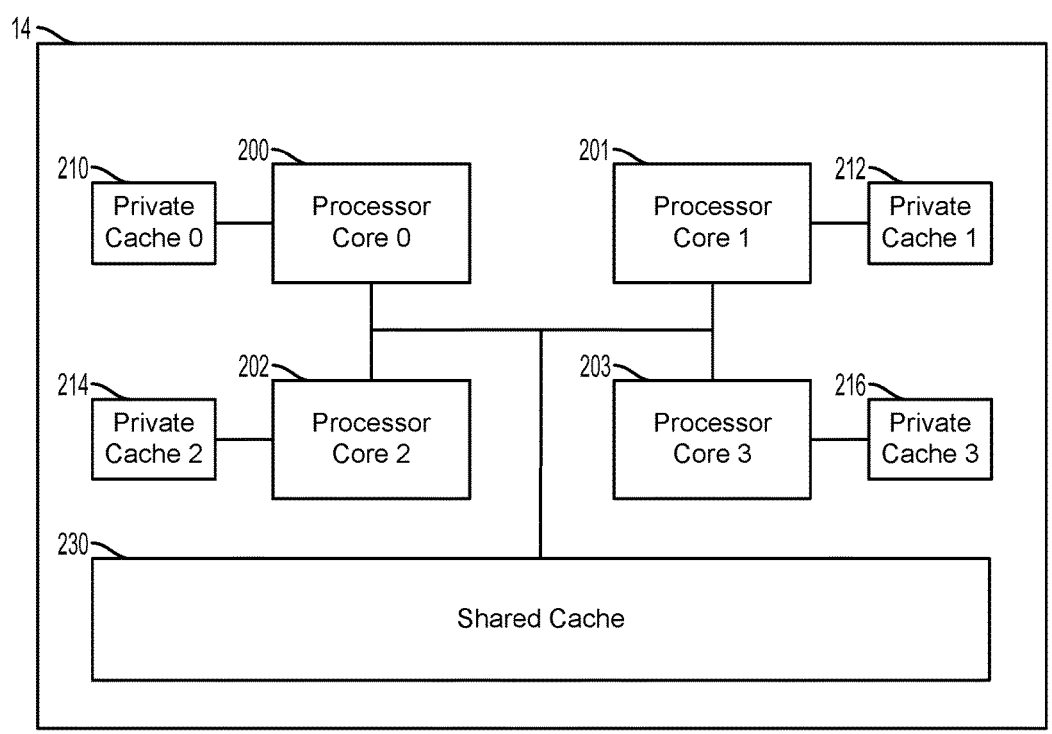
FIG. 2 is a component block diagram illustrating an example multicore processor suitable for implementing an aspect.

FIG. 2 illustrates a multicore processor suitable for implementing an aspect. The multicore processor 14 may include multiple processor types, including, for example, a central processing unit, a graphics processing unit, and/or a digital processing unit. The multicore processor 14 may also include a custom hardware accelerator, which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a graphics processing unit or a digital signal processor, and the processor cores 200, 201, 202, 203 may be homogeneous graphics processor cores or digital signal processor cores, respectively. The multicore processor 14 may be a custom hardware accelerator with homogeneous processor cores 200, 201, 202, 203. For ease of reference, the terms "custom hardware accelerator," "processor," and "processor core" may be used interchangeably herein.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous multicore processors 14. In various aspects, not all off the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured to for read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein.

Figure 3:
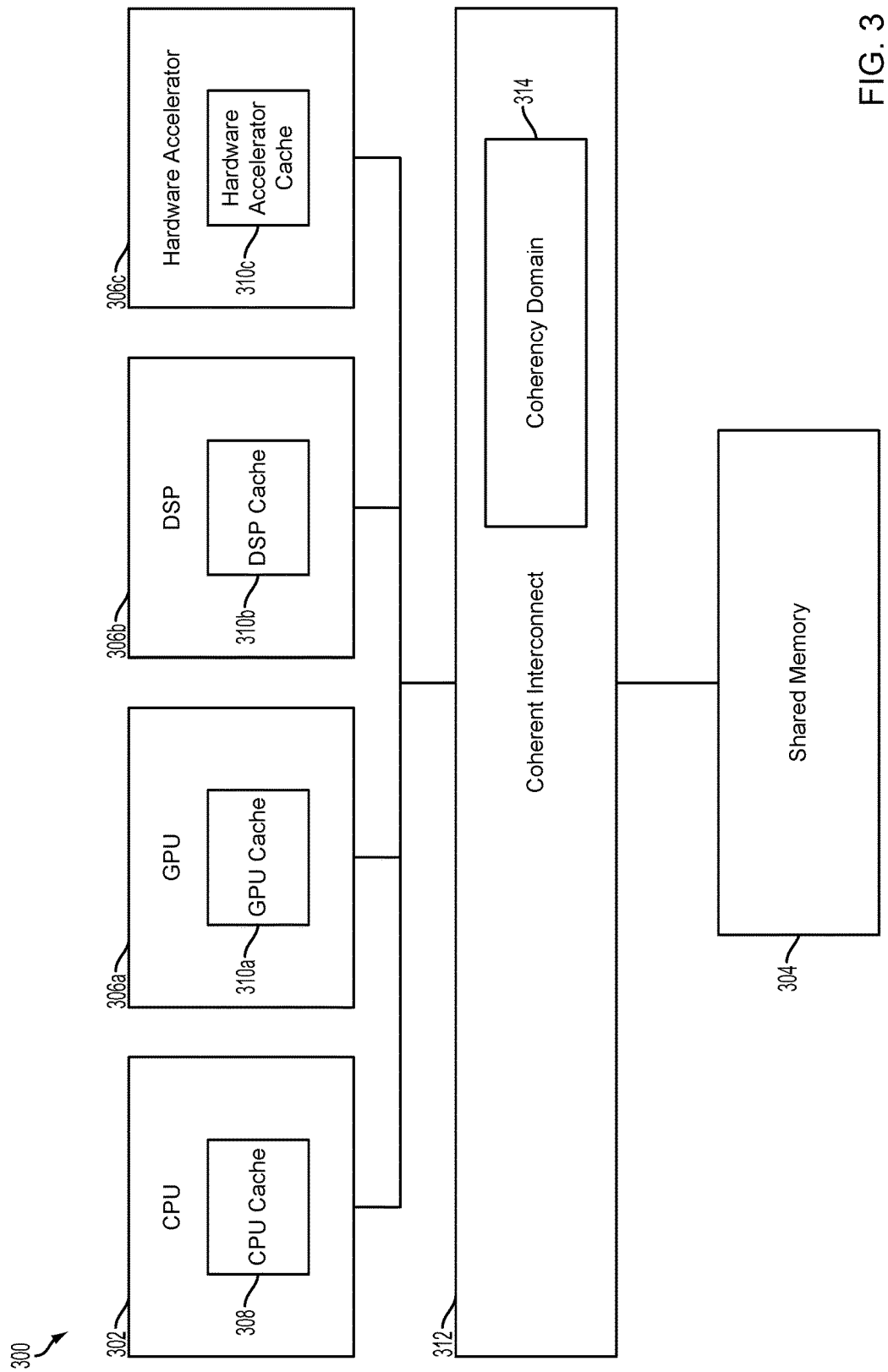
FIG. 3 is a block diagram illustrating an example heterogeneous computing device having a coherent interconnect suitable for implementing an aspect.

FIG. 3 illustrates an example aspect of a heterogeneous computing device having a coherent interconnect. A heterogeneous computing device 300 (e.g., the computing device 10 in FIG. 1) configured to implement a dynamic I/O coherency system 300 may include at least two, but up to any integer number "N" processing devices (e.g., processor 14 in FIGS. 1 and 2); for example, processing device (e.g., CPU) 302, hardware accelerator (e.g., GPU) 306a, hardware accelerator (e.g., DSP) 306b, and/or custom hardware accelerator 306c. Each processing device 302, 306a, 306b, 306c may be associated with a processing device cache (e.g., private caches 210, 212, 214, 216, and/or shared cache 230 in FIG. 2). For example, the processing device 302 may include a processing device cache (e.g., CPU cache) 308, the hardware accelerator 306a may include a hardware accelerator cache (e.g., GPU cache) 310a, the hardware accelerator 306b may include a hardware accelerator cache (e.g., DSP cache) 310b, and/or the custom hardware accelerator 306c may include a custom hardware accelerator cache 310c. As discussed herein, each of the processing devices 302, 306a, 306b, 306c may be homogenous and/or heterogeneous with respect to each other and/or among their respective processor cores (e.g., processor cores 200, 201, 202, 203 in FIG. 2).

A coherent interconnect 312 may be communicatively connected to the processing devices 302, 306a, 306b, 306c, and any number of main memory or random access memory components, such as shared memory 304 (e.g., memory 16, 24 in FIG. 1). The coherent interconnect 312 may be configured to enable and control transmission of data between the various connected components. For a processing device cache 308, 310a, 310b, 310c and/or the shared memory 304 operating in an I/O coherent mode, the coherency mechanisms may be continuously implemented by the coherent interconnect 312 to ensure the correctness of the data in the processing device cache 308, 310a, 310b, 310c and/or the shared memory 304. The coherent interconnect 312 may be configured to transmit data between the processing devices 302, 306a, 306b, 306c so that the processing devices 302, 306a, 306b, 306c may share processing of a workload and output the results of the workload processing. For the results to be correct, the data input to and output from the processing devices 302, 306a, 306b, 306c may be subject to coherency requirements that may be implemented by the coherency mechanisms of the coherent interconnect 312 while the I/O coherent mode is active. In various aspects, a coherency domain 314 or other coherency mechanisms of the coherent interconnect 312, such as a snoop filter (not shown), may be configured to perform coherency checks and invalidations based on receipt of memory access requests to the processing device cache 308, 310a, 310b, 310c and/or the shared memory 304. The coherency domain 314 may also be configured to clear transactions based on receipt of acknowledgements of the transactions between the processing devices 302, 306a, 306b, 306c and/or the shared memory 304.

While the I/O coherent mode is inactive, or the processing device cache 308, 310a, 310b, 310c and/or the shared memory 304 is in a non-I/O coherent mode, correctness of the data input to and output from the processing devices 302, 306a, 306b, 306c may be managed by the processing devices 302, 306a, 306b, 306c themselves. In various aspects, asynchronous cache maintenance operations may be implemented by the processing devices 302, 306a, 306b, 306c for the data stored in the processing device cache 308, 310a, 310b, 310c. In various aspects, components of the processing devices 302, 306a, 306b, 306c, including cache management devices (not shown) and/or the processor cores, may be configured to implement the asynchronous cache maintenance operations. The coherent interconnect 312 may still transmit data between the data between the processing devices 302, 306a, 306b and/or the shared memory 304 without conducting coherency operations.

FIG. 3 illustrates non-limiting examples of a heterogeneous computing device configured to implement a dynamic I/O coherency system. The examples illustrated and described herein, particularly with reference to those of and relating to FIG. 3, are non-limiting. The heterogeneous computing device configured to implement a dynamic I/O coherency system may include any number and/or combination of processing devices, processor cores, processing device caches (e.g., private caches and/or shared caches), coherent interconnects, shared memories, and connections between such components.

Figure 4:
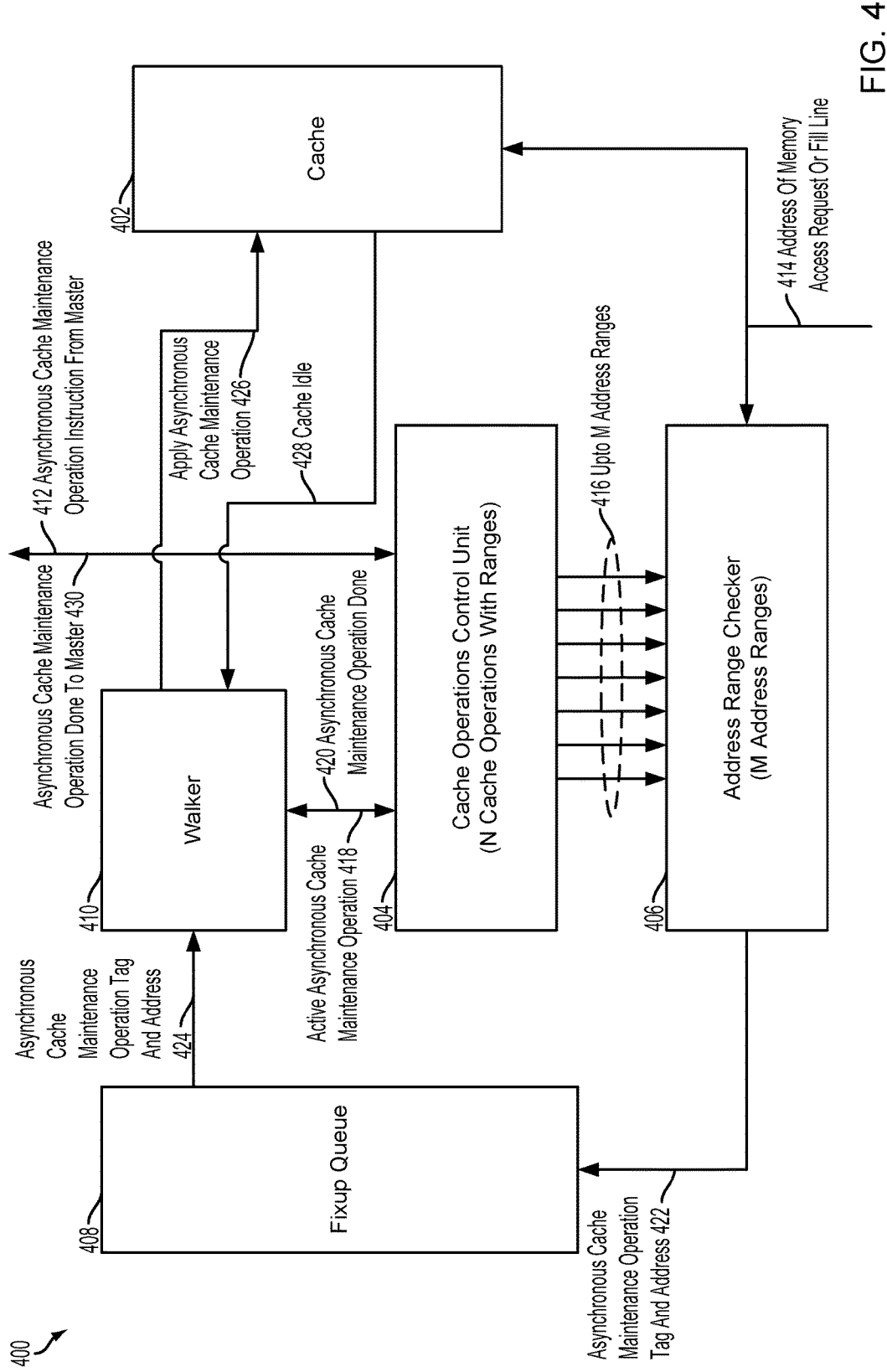
FIG. 4 is block diagram illustrating an example of an asynchronous cache operation system for implementing an aspect

FIG. 4 illustrates an example aspect of a computing device (e.g., the computing device 10 in FIG. 1, and the heterogeneous computing device in FIG. 3) having an asynchronous cache operation system 400. The asynchronous cache operation system 400 may include various combinations of components integral to and/or separate from a processing device (e.g., processor 14 in FIGS. 1 and 2, and CPU 302, GPU 306a, DSP 306b, and custom hardware accelerator 306c in FIG. 3) and/or an SoC (e.g., SoC 12 in FIG. 1). The components of asynchronous cache operation system 400 may include a cache 402 (e.g., memory 16, 24 in FIG. 1, private cache 210, 212, 214, 216, and shared cache 230 in FIG. 2, and CPU cache 308, GPU cache 310a, DSP cache 310b, and custom hardware accelerator cache 310c in FIG. 3), a cache operation control unit 404, an address range checker 406, a fixup queue 408, and a walker 410. Various combinations of these components may be communicatively connected to each other and/or a master (e.g., processor 14 in FIGS. 1 and 2, processor core 200, 201, 202, 203 in FIG. 2, and CPU 302, GPU 306a, DSP 306b, and custom hardware accelerator 306c in FIG. 3). The term "queue" (e.g., the "fixup queue" 408) is used herein for purposes of clarity and ease of explanation, however the fixup queue 408 is not limited to a queue. In various aspects, the fixup queue 408 may be implemented as or using any number and type of hardware storage or data structure that can store data of an address and/or address range and an asynchronous cache maintenance operation tag, as described further herein.

The master may instruct that an asynchronous cache maintenance operation be implemented on a range of addresses in the cache 402. The master may send the asynchronous cache maintenance operation instruction 412 to the cache operation control unit 404, which may be configured to determine whether to implement the asynchronous cache maintenance operation. The cache operation control unit 404 may be configured to receive, store, and control implementation of up to a first number "N" asynchronous cache maintenance operations and associated cache address ranges to be implemented on the cache 402. The asynchronous cache maintenance operations stored and set for implementation may be referred to as active asynchronous cache maintenance operations, as described further herein. In response to receiving the cache maintenance operation instruction 412, the cache operation control unit 404 may activate the asynchronous cache maintenance operation. The cache operation control unit 404 may signal an active asynchronous cache maintenance operation 418 with the associated address range to the walker 410 for implementation of the active asynchronous cache maintenance operation in the cache 402, as described further herein.

The cache 402 may be accessed in response to a memory access request. Cache addresses subject to a memory access request may be active while the master instructs an asynchronous cache maintenance operation. To avoid conflicts in the cache 402, the address range checker 406 may receive the range of addresses for the active asynchronous cache maintenance operations 416 from the cache operation control unit 404, and receive an address of a memory access request (read or write) or a line fill request resulting from a miss for a memory access request 414, which may be referred to as an active address. In various aspects the cache operation control unit 404 may receive multiple active addresses 414 for multiple memory access requests and/or line fill requests. The address range checker 406 may compare the address range to the active address to determine whether any address in the address range is the same as the active address. If there is a match between an address in the address range and the active address, implementing the asynchronous cache maintenance operation without implementing a fixup queue 408, as described further herein, may result in a conflict that may cause the cache maintenance operation to functionally fail and may corrupt future accesses to the address, or corrupt the data for the memory access request or a fill line request. The asynchronous cache maintenance operations resulting in a match may be deferred to be implemented asynchronously, as described further herein. In various aspects, the cache maintenance operations may have already been done for the matching address, and the deferred asynchronous cache maintenance operations may be a repeat implementation of the asynchronous cache maintenance operations for the matching address. If no match between an address in the address range and the active address is identified, then it may be permissible to continue to implement the active asynchronous cache maintenance operation across the cache address ranges of the cache maintenance operations without any action taken by the cache operation control unit 404. The address range checker 406 may be configured to receive and store up to a second number "M" address ranges associated with the asynchronous cache maintenance operations stored by the cache operation control unit 404. The second number "M" may be any number, including a number less than the first number "N". The address range checker 406 may compare up to the second number "M" address ranges with the active address and make a determination of whether there is an address in the address range that matches the active address for each of the up to the second number "M" address ranges.

The active asynchronous cache maintenance operations stored by the cache operation control unit 404 may be the asynchronous cache maintenance operations for which the address range checker 406 does not identify an address in the address range that matches the active address. In response to detecting no match between an address of an address range of an asynchronous cache maintenance operation and an active address, the address range checker 406 may indicate to the cache operation control unit 404 that a checked cache maintenance operation is an active asynchronous cache maintenance operation.

The cache operation control unit 404 may not wait for an indication of an active asynchronous cache maintenance operation before activating and implementing the an active asynchronous cache maintenance operation. The cache operation control unit 404 may assume an asynchronous cache maintenance operation is an active asynchronous cache maintenance operation.

The cache operation control unit 404 may manage the asynchronous cache maintenance operations that are active. A policy may be implemented by the cache operation control unit 404 for prioritizing concurrent asynchronous cache maintenance operations. The cache operation control unit 404 may be able to have N'<=M asynchronous cache maintenance operations with up to N different address ranges active at a time (N' may be >N in the case that address ranges match or are subsets of address ranges in some aspects). Asynchronous cache maintenance operations that do not have an associated address range checker 406 active may be inactive in the cache operation control unit 404 until an address range checker 406 became available.

The cache operation control unit 404 may signal an active asynchronous cache maintenance operation 418 with the associated address range to the walker 410 for implementation of the active asynchronous cache maintenance operation in the cache 402.

The walker 410 may be configured to determine a time at which to implement the active asynchronous cache maintenance operation signaled by the cache operation control unit 404. The walker 410 may implement an active asynchronous cache maintenance operation at a convenient time, for example, when the cache 402 or a bank of the cache 402 containing at least a portion of the range of addresses is idle, which may be indicated to the walker 410 by a cache idle signal 428.

In implementing the active asynchronous cache maintenance operations, the walker 410 may apply the asynchronous cache maintenance operation 426 by traversing the address range for the active asynchronous cache maintenance operation, and implementing the active asynchronous cache maintenance operation to the address range of the cache 402. The walker 410 may store up to a third number "K" of active asynchronous cache maintenance operations and associated address ranges for implantation. In various aspects, the walker 410 may implement up to the third number "K" active asynchronous cache maintenance operations concurrently.

In response to detecting a match between an address of an address range of a cache maintenance operation and an active address, the address range checker 406 may send an asynchronous cache maintenance operation tag and the associated address matching the active address or the associated address range 422 to the fixup queue 408 for storage until the asynchronous cache maintenance operation may be implemented. In various aspects, the address range checker 406 may signal to the cache operation control unit 404 that a match is found for an asynchronous cache maintenance operation.

In some aspects, rather than the address range checker 406 sending the asynchronous cache maintenance operation tag and the associated address or associated address range 422, the cache operation control unit 404 may send the asynchronous cache maintenance operation tag and the associated address or associated address range to the fixup queue 408. The asynchronous cache maintenance operation tag and the associated address or associated address range may be stored in the fixup queue 408 for later implementation of the asynchronous cache maintenance operation. In various aspects, the fixup queue 408 may combine matching associated addresses or associated addresses ranges in the fixup queue 408 into a single fixup queue entry.

Once an asynchronous cache maintenance operation in the fixup queue 408 is deemed ready for execution, the walker 410 may receive the asynchronous cache maintenance operation tag and the associated address range 424 for the asynchronous cache maintenance operation. In various aspects, an asynchronous cache maintenance operation tag and the associated address range in the fixup queue may not become available to the walker 410 until after a given delay, which may be timed to improve performance of the cache 402. The given delay may include an elapsed time, an elapsed number of operations implemented on a relevant cache line in the address range for the cache maintenance operation, and/or an idle period for a given address. In various aspects, an idle period may be measured using a counter in the fixup queue entry that counts down, but is reset on every access to that address. In various aspects, when combining or matching a previous entry, a fixup queue entry may be moved to a position in the fixup queue 408 more distant from a ready position of the fixup queue 408 than a pervious position of the pervious entry in the fixup queue 408.

In various aspects, the walker 410 may activate the asynchronous cache maintenance operation using the code of the asynchronous cache maintenance operation tag for the associated address or associated address range, or identified by its asynchronous cache maintenance operation tag and the associated address or associated address range. In various aspects, the cache operation control unit 404 may continue to store the asynchronous cache maintenance operation and receive a signal from the walker 410 to activate the asynchronous cache maintenance operation identified by its asynchronous cache maintenance operation tag and the associated address range.

In various aspects the walker 410 may implement the active asynchronous cache maintenance operation using the asynchronous cache maintenance operation tag and the associated address or associated address range. In implementing the active asynchronous cache maintenance operations, the walker 410 may apply the asynchronous cache maintenance operation 426 to the associated address or associated address range in the cache 402. The walker 410 may be configured to determine a time at which to implement the active asynchronous cache maintenance operations signaled by the cache operation control unit 404 or received from the fixup queue 408. The walker 410 may implement an active asynchronous cache maintenance operation at a convenient time, for example, when the cache 402 or a bank of the cache 402 containing at least a portion of the range of addresses is idle, which may be indicated to the walker 410 by the cache idle signal 428.

In various aspects, to convert asynchronous cache maintenance operations to synchronous cache maintenance operations, and to implement synchronous cache maintenance operations, the master may request blocking the associated address or associated address range for the asynchronous cache maintenance operation. Blocking the associated address or associated address range in the cache may prevent other operations access requests from modifying the associated address or associated address range of the cache 402 before implementation of the synchronous cache maintenance operations. In an aspect, such address blocking may be implemented on the first matching address of the address range rather than the entire address range for the cache maintenance operation. In various aspects, the address range checker 406 may implement address comparisons for the asynchronous cache maintenance operations and cache access requests.

Upon completion of an active asynchronous cache maintenance operation for the associated address or associated address ranges, the walker 410 may send a first completion notification 420 to the cache operation control unit 404 to indicate completion of the asynchronous cache maintenance operation. A second completion notification 430 may be sent by the cache operation control unit 404 to the master to acknowledge completion of the instruction to implement the asynchronous cache maintenance operation sent by the master 412. Receiving the first completion notification 420 and/or sending the second completion notification 430 may prompt the cache operation control unit 404 to deallocate the asynchronous cache maintenance operation.

The address range checker 406 and the fixup queue 408 may enable asynchronous cache maintenance operations to be delayed in parallel with other cache functions, rather than doing the address range checking on a critical path before a cache access. This parallel delay may be implemented so that the master may not detect any latency or timing discrepancies incurred by the delay.

FIGS. 5-10 illustrate example aspects of workload offloading. These examples illustrate workload offloading from a processing device (e.g., CPU) 302 to a hardware accelerator (e.g., GPU 306a, DSP 306b, custom hardware accelerator 306c, etc.) 306. These examples illustrate workload offloading between the processing device 302 and a single hardware accelerator 306. In various aspects, data transmitted between the processing device 302 and the hardware accelerator 306 may be transmitted through reads/writes to a shared memory (e.g., shared memory 304 in FIG. 3), and can be triggered via a cache miss mechanism. In various aspects, data transmissions, including via the shared memory, may occur throughout execution of the offloaded workload. These examples of one to one workload offloading are nonlimiting, and the processing device 302 may offload portions of the workload to any number of hardware accelerators 306 and/or other processing devices 302, including via any number of shared memories.

In each of the examples illustrated in FIGS. 5-10, the processing device 302 may be tasked with executing a workload. The processing device 302 may be configured to offload portions of the workload to the hardware accelerator 306. The data for the offloaded workload may be stored in the processing device cache (e.g., processing device cache 308 in FIG. 3, and cache 402 in FIG. 4). The data may be transmitted via the coherent interconnect (e.g., coherent interconnect 312 in FIG. 3) to the hardware accelerator 306. In various aspects, the data may be transmitted through the shared memory communicatively connect or integral to the coherent interconnect. The hardware accelerator 306 may execute the offloaded workload using the transmitted data, and transmit the results back to the processing device 302 to be written to the processing device cache.

Figure 5:
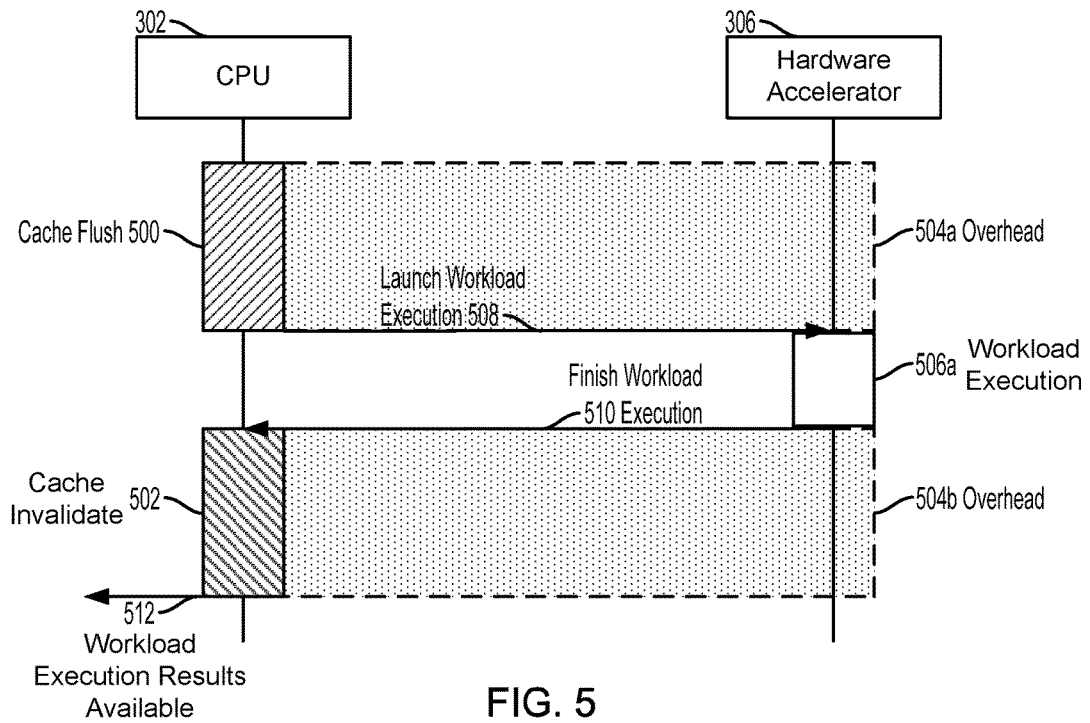
FIG. 5 is a signal and process diagram illustrating an example of non-I/O coherent workload processing for implementing an aspect.

FIG. 5 illustrates an example aspect of non-I/O coherent workload processing. To transmit the data for the offloaded workload to the hardware accelerator 306, and to output the results received from the hardware accelerator 306, the processing device 302 may implement cache maintenance operations to write the data to either the shared memory and then to the hardware accelerator 306 or directly to the hardware accelerator 306 via the coherent interconnect. As noted herein, during non-I/O coherent data transmissions, the coherent interconnect may transmit data between the processing device 302 and the shared memory and/or the hardware accelerator 306 without conducting coherency operations.

To transmit the data for the offloaded workload to the hardware accelerator 306, the processing device 302 may implement a cache flush maintenance operation 500 to write the data to the shared memory and/or to the hardware accelerator 306 via the coherent interconnect. The cache flush maintenance operation 500 writing the data to multiple destinations creates an overhead 504a, which may vary depending on the amount of data in the processing device cache that is written out for the offloaded workload. The data stored in the processing device cache may be stored in partitions or buffers, and the cache flush maintenance operation 500 may be implemented for such specific portions of the processing device cache. Otherwise, the cache flush maintenance operation 500 may be implemented for the whole processing device cache. The overhead 504a may delay the commencement of the offloaded workload execution by the hardware accelerator 306.

During a time correlating to the overhead 504a of the cache flush maintenance operation 500, the processing device 302 may complete offloading a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIG. 3, and cache 402 in FIG. 4). The hardware accelerator 306 may launch execution of the offloaded workload 508, and execute the offloaded workload 506a. The length of time spent executing the offloaded workload may depend on various factors, including size and/or complexity of the offloaded workload, resource use and/or availability of and/or for the hardware accelerator 306 including electrical power, computing power, memory space, communication bandwidth, and/or environmental factors including temperature. The hardware accelerator 306 may finish the offloaded workload execution 510, returning the results of the offloaded workload execution 506a to the processing device 302 via the coherent interconnect.

To make the results of the offloaded workload execution available to the processing device 302, the processing device 302 may implement a cache invalidate maintenance operation 502 to direct future reads of the processing device cache space to the shared memory currently storing the results as a miss after the results are output by the hardware accelerator 306. The cache invalidate maintenance operation 502 may also create an overhead 504b, which may vary depending on the amount of data of the stored offloaded workload results or the space used in the in the processing device cache to store the offloaded workload results. The overhead 504b may delay the availability of the offloaded workload results for access by the processing device 302. Upon completion of the cache invalidate maintenance operation 502, the offloaded workload results may become available 512 for access, use, and/or output of the offloaded workload results by the processing device 302. The processing device 302 may receive the results of the offloaded workload execution 506a and store the results in its processing device cache.

Figure 6:
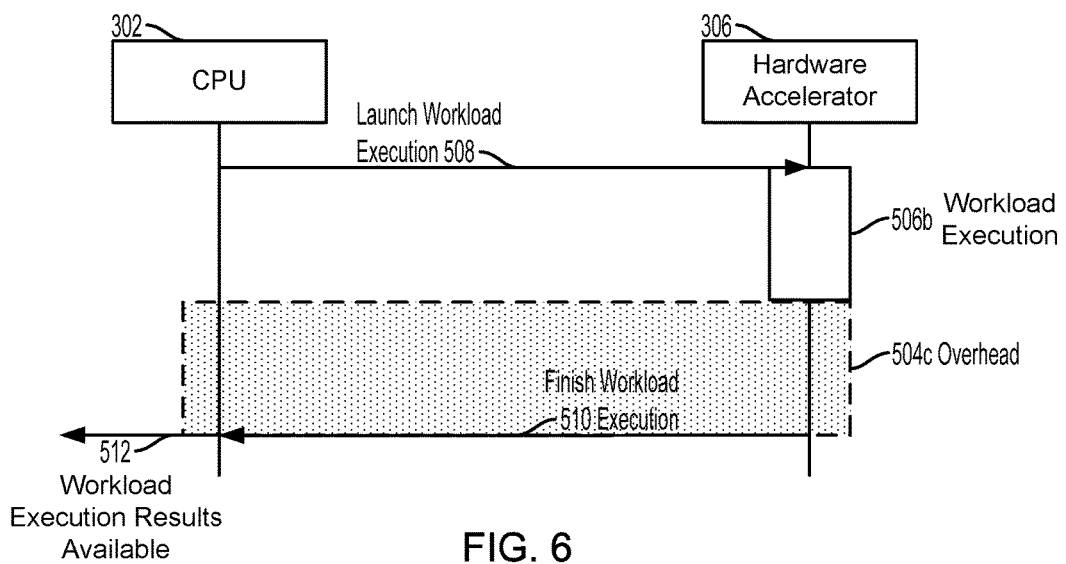
FIG. 6 is a signal and process diagram illustrating an example of I/O coherent workload processing for implementing an aspect.

FIG. 6 illustrates an example aspect of I/O coherent workload processing. To transmit the data for the offloaded workload to the hardware accelerator 306, and to output the results received from the hardware accelerator 306, coherency mechanisms (e.g., the coherency domain 314 in FIG. 3 and/or a snoop filter) may be continuously implemented by the coherent interconnect 312 to ensure the correctness of the data in the processing device cache and/or the shared memory. Thus, while the processing device cache and/or the shared memory are in an I/O coherent mode, the processing device 302 may not implement the cache maintenance operations that it may implement for a non-I/O coherent mode.

The processing device 302 may offload a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIG. 3, and cache 402 in FIG. 4). The hardware accelerator 306 may launch execution of the offloaded workload 508, and execute the offloaded workload 506b. Rather than incurring overhead for transmitting the offloaded workload data as for a processing device cache and/or the shared memory in the non-I/O coherent mode, in the I/O coherent mode the coherency may be maintained while the data is transferred so that no overhead is incurred before the launch execution of the offloaded workload 508.

An increase in overhead 504c may still be incurred during execution of the offloaded workload 506b. This overhead 504c may be caused by the performance of the coherent path the data of the offloaded workload result travels. The coherent interconnect may not be able to implement its coherency mechanisms and transfer the offloaded workload result as quickly as the hardware accelerator 306 produces the offloaded workload result. The coherent interconnect may cause a bottleneck for the offloaded workload result while implementing the coherency mechanisms resulting in the added overhead 504c. In various aspects, the overhead 404c may be proportional or roughly proportional to the run time of the hardware accelerator 306 for executing the offloaded workload 506b.

Once the coherency mechanisms of the coherent interconnect complete their operations to ensure correctness of the offloaded workload result in the processing device cache and/or the shared memory, the offloaded workload result may become available 512 for access, use, and/or output of the offloaded workload result by the processing device 302.

Figure 7:
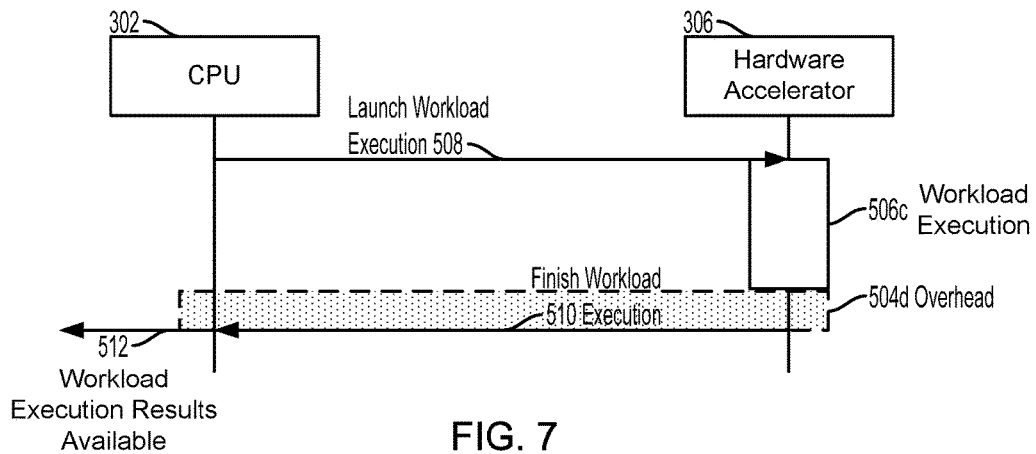
FIG. 7 is a signal and process diagram illustrating an example of dynamic I/O coherent workload processing for implementing an aspect.
Figure 8:
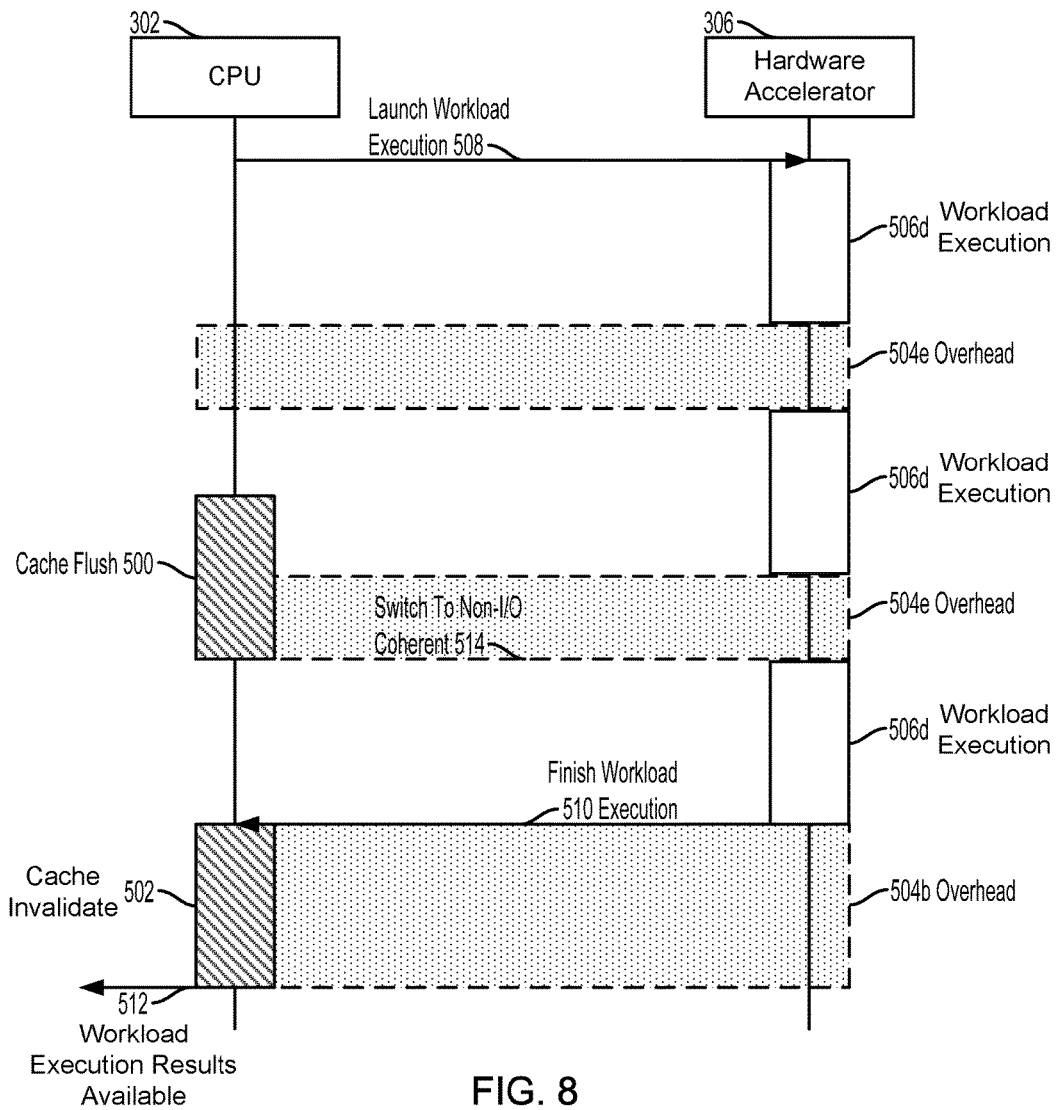
FIG. 8 is a signal and process diagram illustrating an example of dynamic I/O coherent workload processing for implementing an aspect.

FIGS. 7 and 8 illustrate example aspects of dynamic I/O coherent workload processing. In the examples illustrated in each of FIGS. 7 and 8, workload offloading by the processing device 302 may begin with the processing device cache and/or the shared memory in an I/O coherent mode. Thus, to transmit the data for the offloaded workload to the hardware accelerator 306, and to output receive and/or the results generated by the hardware accelerator 306, coherency mechanisms (e.g., the coherency domain 314 in FIG. 3 and/or a snoop filter) may be continuously implemented by the coherent interconnect 312 to ensure the correctness of the data in the processing device cache and/or the shared memory. Thus, while the processing device cache and/or the shared memory are in an I/O coherent mode, the processing device 302 may not implement the cache maintenance operations that it may implement for a non-I/O coherent mode.

The processing device 302 may offload a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally.

In various aspects, the hardware accelerator 306 may store any transmitted data for the offloaded workload to its hardware accelerator cache (e.g., processing device cache 310a, 310b, 310c in FIG. 3, and cache 402 in FIG. 4). The hardware accelerator 306 may launch execution of the offloaded workload 508 and execute the offloaded workload 506c, 506d. Rather than incurring overhead for transmitting the offloaded workload data as for a processing device cache and/or the shared memory in the non-I/O coherent mode, in the I/O coherent mode the coherency may be maintained while the data is transferred so that not overhead is incurred before the launch execution of the offloaded workload 508.

The example illustrated in FIG. 7 is an implementation of dynamic I/O coherent workload processing for a short run offloaded workload execution by the hardware accelerator 306. As described herein, an overhead 504d may still be incurred for execution of the offloaded workload 506c. In dynamic I/O coherent workload processing, as long as the overhead 504d remains below an overhead threshold, the execution of the offloaded workload 506c may continue with the processing device cache and/or the shared memory in an I/O coherent mode. Thus, the overhead 504d is limited to the overhead caused by the performance of the coherent interconnect transmitting the offloaded workload result as described herein. Once the coherency mechanisms of the coherent interconnect complete their operations to ensure correctness of the offloaded workload result in the processing device cache and/or the shared memory, the offloaded workload result may become available 512 for access, use, and/or output of the offloaded workload result by the processing device 302.

The example illustrated in FIG. 8 is an implementation of dynamic I/O coherent workload processing for a long run offloaded workload execution by the hardware accelerator 306. As described herein, an overhead 504e may still be incurred for execution of the offloaded workload 506c. In dynamic I/O coherent workload processing, a long run offloaded workload may produce an overhead 504e that exceeds an overhead threshold. Various methods may be used to detect a long run workload that exceeds the overhead threshold, including the processing device 302 entering an idle state, an elapsed time, and/or suffering of the execution of the offloaded workload, as described further herein.

In response to detecting a long run offloaded workload, the processing device 302 may dynamically transition the processing device cache and/or the shared memory from an I/O coherent mode to a non-I/O coherent mode. In order to transition from an I/O coherent mode to a non-I/O coherent mode, the processing device 302 may begin to implement cache maintenance operations while the processing device cache and/or the shared memory remains in an I/O coherent mode. For example, the processing device 302 may implement a cache flush maintenance operation 500 while the hardware accelerator continues the offloaded workload execution 506d. During the cache flush maintenance operation 500, the offloaded workload execution 506d may continue to incur the I/O coherent mode overhead 504e, but no overhead may be incurred for the cache flush maintenance operation 500. Thus, the overhead 504d may be limited to the overhead caused by the performance of the coherent interconnect transmitting the offloaded workload result as described herein Upon completion of the cache flush maintenance operation 500, the processing device cache and/or the shared memory may dynamically switch from an I/O coherent mode to a non-I/O coherent mode 514. The switch between an I/O coherent mode and a non-I/O coherent mode 514 may not interrupt the offloaded workload execution 506d. While the offloaded workload execution 506d continues, no more I/O coherent mode overhead 504e may be incurred. The hardware accelerator 306 may finish the offloaded workload execution 510, returning the results of the offloaded workload execution 506d to the processing device 302 via the coherent interconnect and/or the shared memory.

To make the results of the offloaded workload execution available to the processing device 302, the processing device 302 may implement a cache invalidate maintenance operation 502 as discussed further herein. The cache invalidate maintenance operation 502 may create an overhead 504b, which may vary depending on the amount of data of the stored offloaded workload results or the space used in the in the processing device cache to store the offloaded workload results. The overhead 504b may delay the availability of the offloaded workload results for access by the processing device 302. Upon completion of the cache invalidate maintenance operation 502, the offloaded workload results may become available 512 for access, use, and/or output the offloaded workload results by the processing device 302. The processing device 302 may receive the results of the offloaded workload execution 506a and store the results in its processing device cache.

Figure 9:
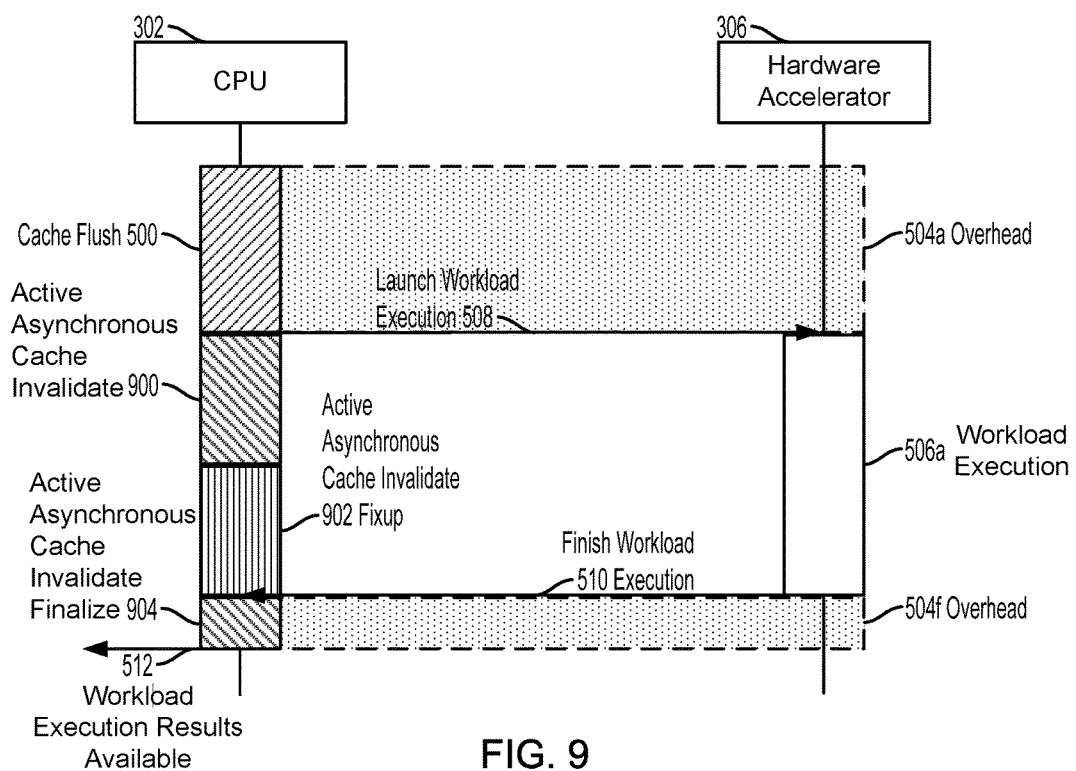
FIG. 9 is a signal and process diagram illustrating an example of non-I/O coherent workload processing with asynchronous cache maintenance operations for implementing an aspect.

FIG. 9 illustrates an example aspect of non-I/O coherent workload processing with asynchronous cache maintenance operations. To transmit the data for the offloaded workload to the hardware accelerator 306, and to output the results received from the hardware accelerator 306, the processing device 302 may implement synchronous and/or asynchronous cache maintenance operations to write the data to either the shared memory and then to the hardware accelerator 306 or directly to the hardware accelerator 306 via the coherent interconnect. As noted herein, during non-I/O coherent data transmissions, the coherent interconnect may transmit data between the processing device 302 and the shared memory and/or the hardware accelerator 306 without conducting coherency operations.

Non-I/O coherent workload processing with asynchronous cache maintenance operations may be similar to non-I/O coherent workload processing, as described herein with reference to FIG. 5. However, the inclusion of asynchronous cache maintenance operations in non-I/O coherent workload processing may reduce the amount of overhead incurred as certain cache maintenance operations may be executed asynchronously and in parallel with memory access operations on the processing device cache.

To transmit the data for the offloaded workload to the hardware accelerator 306, the processing device 302 may implement a cache flush maintenance operation 500 to write the data to the shared memory and/or to the hardware accelerator 306 via the coherent interconnect. The cache flush maintenance operation 500 writing the data to multiple destinations creates an overhead 504a, which may vary depending on the amount of data in the processing device cache that is written out for the offloaded workload. The data stored in the processing device cache may be stored in partitions or buffers, and the cache flush maintenance operation 500 may be implemented for such specific portions of the processing device cache. Otherwise, the cache flush maintenance operation 500 may be implemented for the whole processing device cache. The overhead 504a may delay the commencement of the offloaded workload execution by the hardware accelerator 306.

During a time correlating to the overhead 504a of the cache flush maintenance operation 500, the processing device 302 may complete offloading a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIG. 3). The hardware accelerator 306 may launch execution of the offloaded workload 508.

The hardware accelerator 306 may execute the offloaded workload 506a. The length of time spent executing the offloaded workload may depend on various factors, including size and/or complexity of the offloaded workload, resource use and/or availability of and/or for the hardware accelerator 306 including electrical power, computing power, memory space, communication bandwidth, and/or environmental factors including temperature. Rather than waiting for completion of the offloaded workload, the processing device 302 may begin executing cache invalidate maintenance operations in parallel with the offloaded workload execution 506a. The processing device 302 may being implementing active asynchronous cache invalidate maintenance operations 900 as their address ranges may not conflict with any active addresses for data of the offloaded workload execution 506a. The processing device 302 may implement in a delayed manner the active asynchronous cache invalidate maintenance operations 902 from the fixup queue (e.g., fixup queue 408 in FIG. 4), but still in parallel with the offloaded workload execution 506a when the address ranges may not conflict with any active addresses for data of the offloaded workload execution 506a. The hardware accelerator 306 may finish the offloaded workload execution 510, returning the results of the offloaded workload execution 506a to the shared memory via the coherent interconnect.

To make the results of the offloaded workload execution available to the processing device 302, the processing device 302 may implement any leftover active asynchronous cache invalidate maintenance operations 904 to finalize the cache maintenance operations, and make the offloaded workload results available 512 for access, use, and/or output by the processing device 302. Leftover active asynchronous cache invalidate maintenance operations may include active asynchronous cache invalidate maintenance operations for implementation separate from or included in the active asynchronous cache invalidate maintenance operations from the fixup queue. As compared with the overhead (e.g., 504*b* in FIG. 5) for non-I/O coherent workload processing, the overhead 504*f* for I/O coherent workload processing with asynchronous cache maintenance operations resulting from the remaining active asynchronous cache invalidate maintenance operations executed 904 after receiving the offloaded workload results 510, the overhead 504*f* is reduced due to having to implement fewer cache invalidate maintenance operations. The processing device 302 may receive the results of the offloaded workload execution 506*a* and store the results in its processing device cache.

Figure 10:
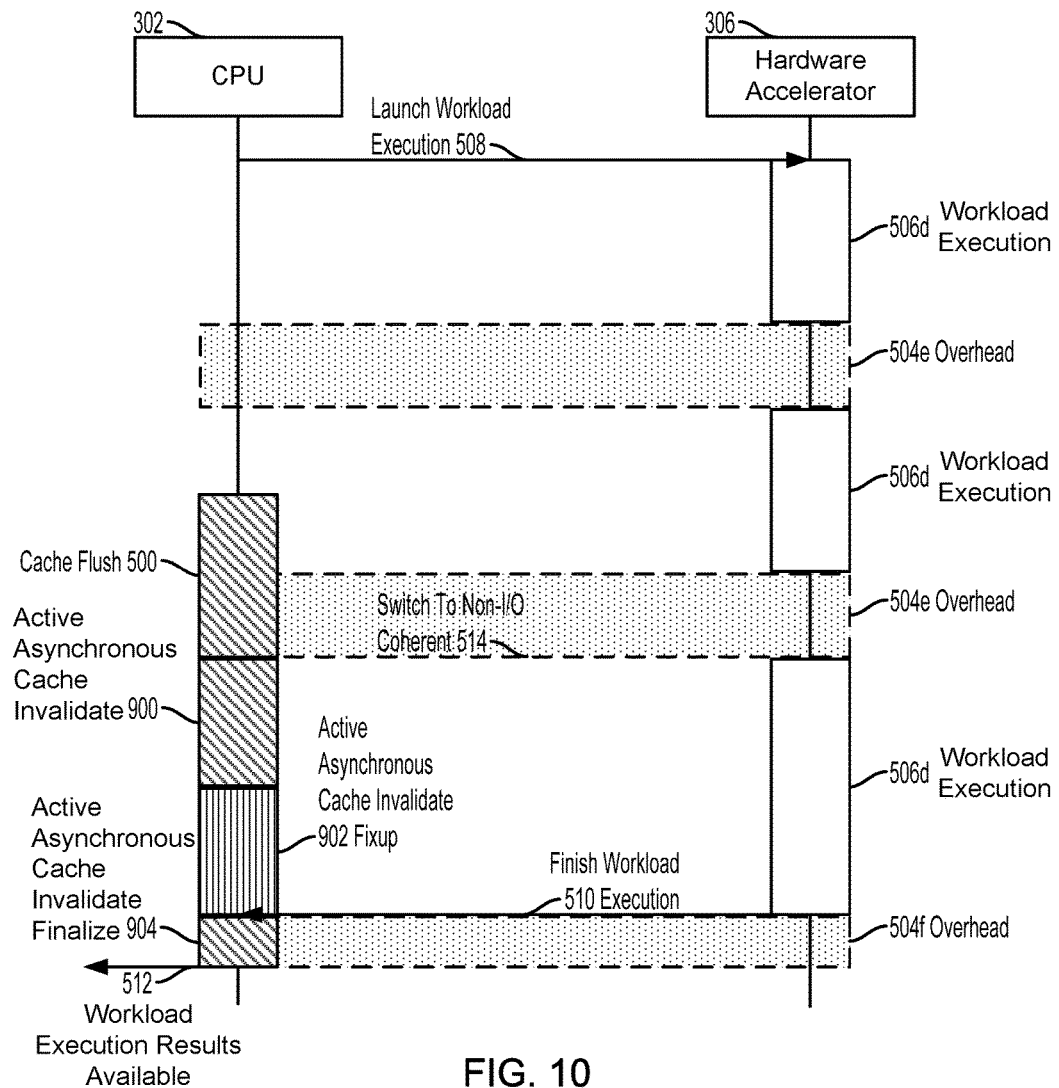
FIG. 10 is a signal and process diagram illustrating an example of dynamic I/O coherent workload processing with asynchronous cache maintenance operations for implementing an aspect.

FIG. 10 illustrates an example aspect of dynamic I/O coherent workload processing with asynchronous cache maintenance operations. In the example illustrated in FIG. 10, workload offloading by the processing device 302 the processing device cache and/or the shared memory may be in an I/O coherent mode. Thus, to transmit the data for the offloaded workload to the hardware accelerator 306, and to receive and/or output the results generated by the hardware accelerator 306, coherency mechanisms (e.g., the coherency domain 314 in FIG. 3 and/or a snoop filter) may be continuously implemented by the coherent interconnect 312 to ensure the correctness of the data in the processing device cache and/or the shared memory. Thus, while the processing device cache and/or the shared memory are in an I/O coherent mode, the processing device 302 may not implement the cache maintenance operations that it may implement for a non-I/O coherent mode.

Dynamic I/O coherent workload processing with asynchronous cache maintenance operations may be similar to dynamic I/O coherent workload processing, as described herein with reference to FIG. 8. However, the inclusion of asynchronous cache maintenance operations in I/O coherent workload processing may reduce the amount of overhead incurred as certain cache maintenance operations may be executed asynchronously and in parallel with memory access operations on the processing device cache.

The processing device 302 may offload a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310*a*, 310*b*, 310*c* in FIG. 3). The hardware accelerator 306 may launch execution of the offloaded workload 508 and execute the offloaded workload 506*d*. Rather than incurring overhead for transmitting the offloaded workload data as for a processing device cache and/or the shared memory in the non-I/O coherent mode, in the I/O coherent mode the coherency may be maintained while the data is transferred so that not overhead is incurred before the launch execution of the offloaded workload 508.

The example illustrated in FIG. 10 is an implementation of dynamic I/O coherent workload processing for a long run offloaded workload execution by the hardware accelerator 306. As described herein, an overhead 504*e* may still be incurred for execution of the offloaded workload 506*c*. In dynamic I/O coherent workload processing, a long run offloaded workload may produce an overhead 504*e* that exceeds an overhead threshold. Various methods may be used to detect a long run workload that exceeds the overhead threshold, including an elapsed time and/or suffering of the execution of the offloaded workload, as described further herein.

In response to detecting a long run offloaded workload, the coherent interconnect may dynamically transition the processing device cache and/or the shared memory to a non-I/O coherent mode. In order to transition from an I/O coherent mode to a non-I/O coherent mode, the processing device 302 may begin to implement cache maintenance operations while the coherent interconnect and/or shared memory remains in an I/O coherent mode. For example, the processing device 302 may implement a cache flush maintenance operation 500 while the hardware accelerator continues the offloaded workload execution 506*d*. During the cache flush maintenance operation 500, the offloaded workload execution 506*d* may continue to incur the I/O coherent mode overhead 504*e*, but no overhead may be incurred for the cache flush maintenance operation 500. Thus, the overhead 504*d* may be limited to the overhead caused by the performance of the coherent interconnect transmitting the offloaded workload result as described herein.

Upon completion of the cache flush maintenance operation 500, the processing device, the coherent interconnect, and/or the shared memory may dynamically transition to a non-I/O coherent write mode 514. The switch between an I/O coherent mode and a non-I/O coherent mode 514 may not interrupt the offloaded workload execution 506*d*. While the offloaded workload execution 506*d* continues, active asynchronous cache maintenance operations may be executed 900 and active asynchronous cache maintenance operations from the fixup queue (e.g., fixup queue 408 in FIG. 4) may be executed 902 in a similar manner as described herein with reference to FIG. 9. The hardware accelerator 306 may finish the offloaded workload execution 510, returning the results of the offloaded workload execution 506*d* to the shared memory via the coherent interconnect. The processing device 302 may implement any leftover active asynchronous cache invalidate maintenance operations 904 to finalize the cache maintenance operations in a similar manner as described herein with reference to FIG. 9. The offloaded workload results may become available 512 for access, use, and/or output of the offloaded workload results by the processing device 302. As compared with the overhead (e.g., 504*b* in FIG. 8) for dynamic I/O coherent workload processing, the overhead 504*f* for dynamic I/O coherent workload processing with asynchronous cache maintenance operations resulting from the remaining cache invalidate maintenance operations executed 904 after receiving the offloaded workload results 510, the overhead 504*f* is reduced due to having to implement fewer cache invalidate maintenance operations.

Figure 11:
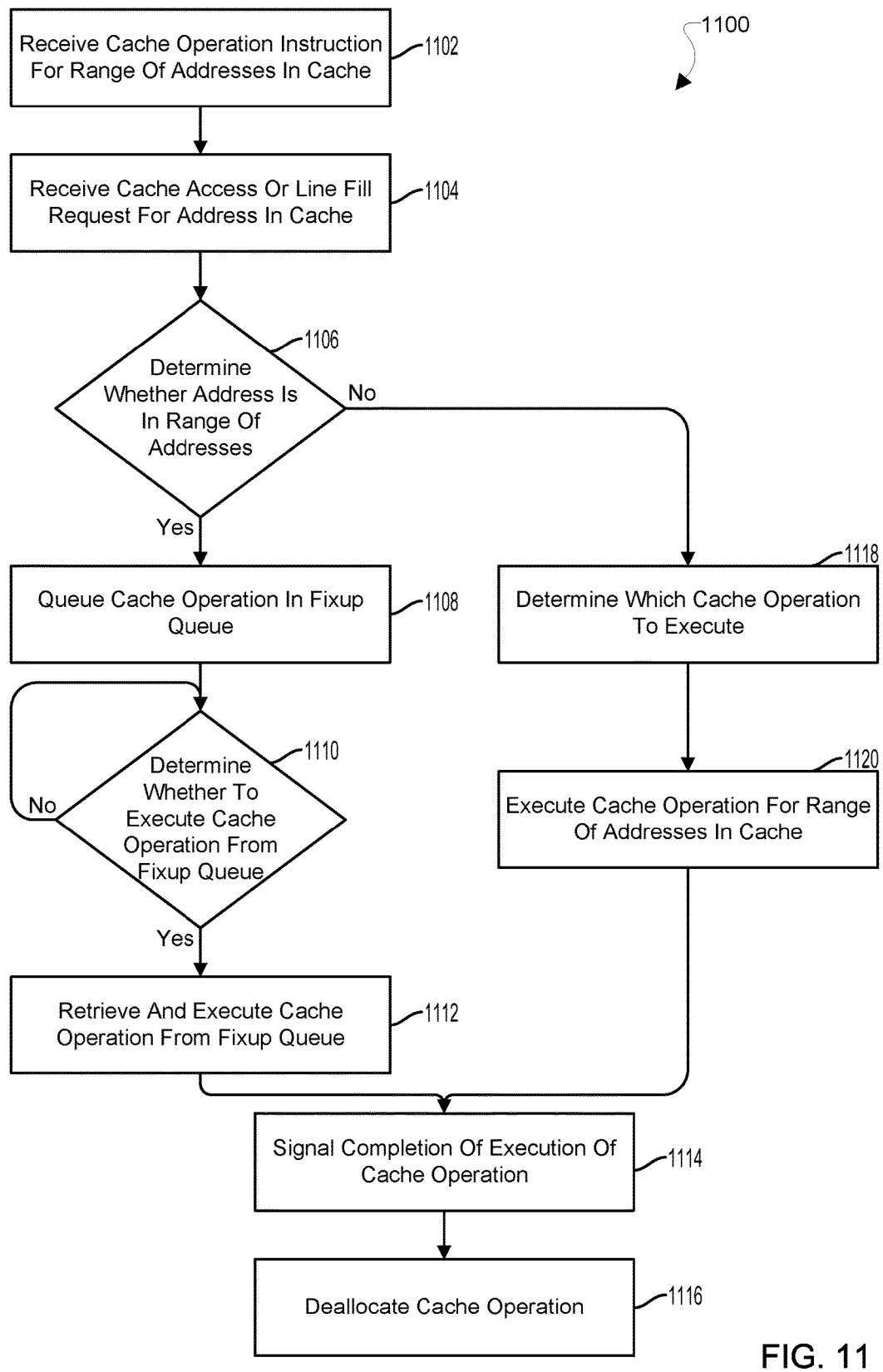
FIG. 11 is a process flow diagram illustrating a method for implementing asynchronous cache maintenance operations according to an aspect.

FIG. 11 illustrates a method 1100 for implementing asynchronous cache maintenance operations according to an aspect. The method 1100 may be implemented in a computing device in software executing in a processor (e.g., the processor 14 in FIGS. 1 and 2 and processing device 302 in FIGS. 3 and 5-10), in general purpose hardware, in dedicated hardware, or in a combination of a software-configured processor and dedicated hardware, such as a processor executing software within an asynchronous cache operation system (e.g., FIG. 4) that includes other individual components. In order to encompass the alternative configurations enabled in the various aspects, the hardware implementing the method 1100 is referred to herein as a "processing device."

In block 1102, the processing device may receive an asynchronous cache maintenance operation instruction for a range of addresses in the hardware accelerator cache (e.g., processing device cache 308 in FIG. 3, and cache 402 FIG. 4). The processing device may activate the asynchronous cache maintenance operation for execution upon receipt of the asynchronous cache maintenance operation instruction. In block 1104, the processing device may receive at least one memory access request or a line fill request for an address in the cache.

In determination block 1106, the processing device may determine whether the address of the memory access request or the line fill request is in a range of addresses for the active asynchronous cache maintenance operation instruction. The processing device may make any of various comparisons to determine whether the address is in the range of addresses, include comparing the address to beginning and/or end address of the range, to one of a beginning and/or end address of the range and a calculated other of a beginning and/or end address of the range based on a length of the range, and/or individual addresses of the range of addresses.

In response to determining that the address of the memory access request or the line fill request is in the range of addresses for the active asynchronous cache maintenance operation instruction (i.e., determination block 1106="Yes"), the processing device may queue the active asynchronous cache maintenance operation in the fixup queue (e.g., fixup queue 408 in FIG. 4) as an asynchronous cache maintenance operation, in block 1108. The processing device may do this by storing an asynchronous cache maintenance operation tag associated with the matched address, which may include an active address or an active range of addresses.

In determination block 1110, the processing device may determine whether to execute the asynchronous cache maintenance operation from the fixup queue. As discussed herein, the determination whether to execute the asynchronous cache maintenance operation from the fixup queue may be made based on a position of the asynchronous cache maintenance operation in the fixup queue (e.g., at the top of the fixup queue), based on an elapsed time, based on an elapsed number of operations implemented on a relevant cache line in the address range for the asynchronous cache maintenance operation, and/or based on an idle state for a relevant cache address.

In response to determining not to execute the asynchronous cache maintenance operation from the fixup queue (i.e., determination block 1110="No"), the processing device may continually evaluate whether to execute the asynchronous cache maintenance operation from the fixup queue in determination block 1110.

In response to determining to execute the asynchronous cache maintenance operation from the fixup queue (i.e., determination block 1110="Yes"), the processing device may retrieve the asynchronous cache maintenance operation as an active asynchronous cache maintenance operation from the fixup queue and execute the active asynchronous cache maintenance operation from the fixup queue in block 1112. In various aspects, the asynchronous cache maintenance operation may be retrieved as an active asynchronous cache maintenance operation based on the previous activation of the asynchronous cache maintenance operation in response to receiving the asynchronous cache maintenance operation instruction in block 1102. In various aspects, the asynchronous cache maintenance operation may be retrieved as an active asynchronous cache maintenance operation based on a signal received by the processing device for activating the asynchronous cache maintenance operation related to the retrieval and execution of the asynchronous cache maintenance operation in block 1112. The execution of the active asynchronous cache maintenance operation from the fixup queue may be delayed until an appropriate time, such as when the cache or a bus of the cache is idle.

In response to determining that the address of the memory access request or the line fill request is not in a range of addresses for the active asynchronous cache maintenance operation instruction (i.e., determination block 1106="No"), the processing device may determine which active asynchronous cache maintenance operations to execute 1118. In various aspects, the processing device may execute the active asynchronous cache maintenance operation as it is available (according to cache state). In various aspects, the execution of the active cache maintenance operation may be delayed until an appropriate time, such as when the cache or a bus of the cache is idle.

In block 1120, the processing device may execute the active asynchronous cache maintenance operation for the range of addresses in the cache.

Following the execution of the active asynchronous cache maintenance operation for the range of addresses in the cache in block 1112 or block 1120, the processing device may signal completion of the execution of the active asynchronous cache maintenance operation in block 1114. The signal may be sent to multiple destinations, including a master that requested the memory access or the line file in the cache and/or a cache operation control unit (e.g., cache operation control unit 404 in FIG. 4).

In block 1116, the processing device may deallocate the executed active asynchronous cache maintenance operation. Deallocation of the active asynchronous cache maintenance operation may prevent unrequested execution of the cache maintenance operation and free up resources, like address checkers (e.g., address checker 406 in FIG. 4) for other asynchronous cache maintenance operations.

In various aspects, at any point during the method 1100, the processing device may receive a request to convert an asynchronous cache maintenance operation to a synchronous cache maintenance operation. An asynchronous cache maintenance operation may be converted to a synchronous cache maintenance operation in the event that the asynchronous cache maintenance operation has exceeded a threshold for being in the fixup queue. The threshold may be based on similar criteria as the criteria for executing the asynchronous cache maintenance operation. The synchronous cache maintenance operation may be associated with a request to block the associated address or associated address range of the asynchronous cache maintenance operation in the cache prior to execution of the synchronous cache maintenance operation to prevent other accesses to the address range prior to execution of the synchronous cache maintenance operation. The processing device may block the associated address or associated address range of the asynchronous cache maintenance operation and execute the synchronous cache maintenance operation. Following the execution of the synchronous cache maintenance operation, the processing device may signal completion of the execution of the synchronous cache maintenance operation, similar to signaling the completion of the execution of the active asynchronous cache maintenance operation in block 1114. The processing device may also deallocate the executed synchronous cache maintenance operation, similar to deallocating the executed active asynchronous cache maintenance operation in block 1116.

Figure 12:
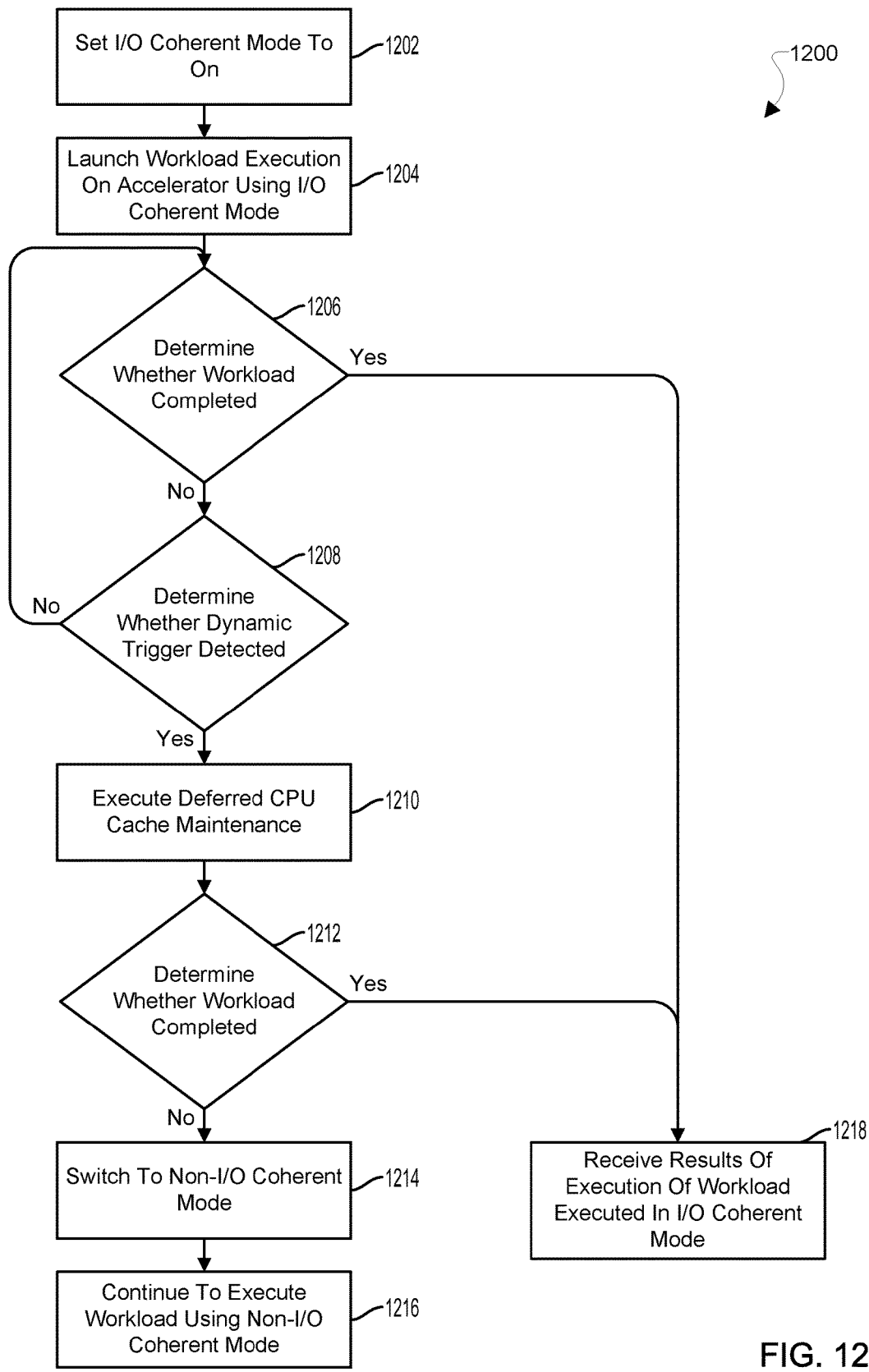
FIG. 12 is a process flow diagram illustrating a method for implementing dynamic I/O coherent workload processing with asynchronous cache maintenance operations according to an aspect.

FIG. 12 illustrates a method 1200 for implementing dynamic I/O coherent workload processing with asynchronous cache maintenance operations according to an aspect. The method 1200 may be implemented in a computing device in software executing in a processor (e.g., the processor 14 in FIGS. 1 and 2 and processing device 302 in FIGS. 3 and 5-10), in general purpose hardware, in dedicated hardware, or in a combination of a software-configured processor and dedicated hardware, such as a processor executing software within a dynamic I/O coherency system (e.g., FIG. 3) and/or an asynchronous cache operation system (e.g., FIG. 4) that includes other individual components. In order to encompass the alternative configurations enabled in the various aspects, the hardware implementing the method 1200 is referred to herein as a "processing device."

In block 1202, the processing device may set an I/O coherent mode to "on" for a processing device cache (e.g., processing device cache 308 in FIG. 3, cache 402 in FIG. 4) and/or a shared memory (e.g., shared memory 304 in FIG. 3). Alternatively, the processing device may set a non-I/O coherent mode to "off" for the processing device cache and/or the shared memory. In various aspects, the I/O coherent mode may be set to "on" as a default state for the processing device cache and/or the shared memory, therefore setting the I/O coherent mode to "on" may be unnecessary. Setting the I/O coherent mode to "on" may be a precautionary measure even if "on" is the default I/O coherent mode state.

In block 1204, the processing device may launch the offloaded workload execution on a hardware accelerator (e.g., GPU 306a, DSP 306b, custom hardware accelerator 306c in FIG. 3 and hardware accelerator 306 in FIGS. 5-10) using I/O coherent mode. As discussed herein, launching the execution may be immediate to the offloading of the workload to the hardware accelerator, as no overhead may be incurred for transmitting data from the processing device to the hardware accelerator when using I/O coherent mode. The memory access requests to transmit data between the processing device and the hardware accelerator may be routed through an I/O coherent path of the coherent interconnect (e.g., the coherent domain 314 in FIG. 3). The data transmitted between the processing device and the hardware accelerator may include data from the processing device to the hardware accelerator for executing the offloaded workload and data from the hardware accelerator to the processing device as results of the executed offloaded workload. Data transmitted between the processing device and the hardware accelerator may be transmitted through the shared memory.

In determination block 1206, the processing device may determine whether the offloaded workload has been completed by the hardware accelerator.

In response to determining that the offloaded workload is completed by the hardware accelerator (i.e., determination block 1206="Yes"), the processing device may receive results of the execution of the offloaded workload from the hardware accelerator in block 1218. The results of the execution of the offloaded workload may be output by the hardware accelerator to the shared memory and retrieved from the shared memory by the processing device. Completion of execution of the offloaded workload entirely in I/O coherent mode may signify that cache maintenance operations are unnecessary as a result of the I/O coherent mechanisms of the coherent interconnect managing coherency of the data.

In response to determining that the offloaded workload is not completed by the hardware accelerator (i.e., determination block 1206="No"), the processing device may determine whether a dynamic trigger for switching between I/O coherent mode and non-I/O coherent mode is detected in determination block 1208. The dynamic trigger may be used to determine when the offloaded workload may be growing to the point that the I/O coherent mode overhead penalty may be undesirable or unacceptable. Determining whether the dynamic trigger is detected may be accomplished in any combination of various manners.

In some aspects, the dynamic trigger may include a preset or calculated time to elapse, and detecting the dynamic trigger may involve detecting that the time has elapsed. The time may be preset or calculated based on an expected amount of time for execution of the offloaded workload by the hardware accelerator. In various aspects, the expected execution time of the offloaded workload may be based on various factors, including size and/or complexity of the offloaded workload, resource use and/or availability of and/ or for the hardware accelerator including electrical power, computing power, memory space, and/or communication bandwidth, and/or environmental factors including temperature. In various aspects, the time may be preset or calculated as a trivial value, such as zero (0), to trigger immediate switching between I/O coherent mode and non-I/O coherent mode.

In some aspects, the dynamic trigger may include sensing the processing device transitioning to and/or being in an idle state. The idle state may indicate that the hardware accelerator may be executing the offloaded workload slower than expected because the processing device has run out of work and is waiting for the hardware accelerator to finish the offloaded workload. The goal of offloading workloads is to efficiently use computing resources to execute the workloads. Thus, the processing device transitioning to and/or being in an idle state may indicate inefficient use of computing resources.

In some aspects, the dynamic trigger may include indicators of the execution of the offloaded workload suffering from using the I/O coherent path. Offloaded workload suffering may be detected based on a variety of metrics. Augmented workloads may notify a driver of performance. The use of static assignment or method based on workload classification, either via testing or random testing, may lead to standard time-outs or signals that indicate workload suffering. Polling hardware performance registers may provide data that indicates workload suffering. Persistently high interconnect operating levels, such as bandwidth and/or outstanding transactions, near maximum may indicate throttling. High accelerator memory latency may indicate latency limitations. High accelerator memory backpressure may indicate bandwidth throttling. High accelerator idle due to memory in conjunction with high occupancy memory request queues may indicate that bandwidth is limited.

In response to determining that a dynamic trigger for switching between I/O coherent mode and non-I/O coherent mode is not detected (i.e., determination block 1208="No"), the processing device may determine whether the offloaded workload is completed by the hardware accelerator in determination block 1206.

In response to determining that a dynamic trigger for switching between I/O coherent mode and non-I/O coherent mode is detected (i.e., determination block 1208="Yes"), the processing device may execute deferred processing device cache maintenance in block 1210. As discussed herein, in preparation for switching from I/O coherent mode to non-I/O coherent mode, the processing device may execute a cache flush maintenance operation for the processing device cache. The hardware accelerator may continue to execute the offloaded workload while the processing device executes the cache flush maintenance operation in block 1210.

In determination block 1212, the processing device may determine whether the offloaded workload is completed by the hardware accelerator.

In response to determining that the offloaded workload is completed by the hardware accelerator (i.e., determination block 1212="Yes"), the processing device may receive results of the execution of the offloaded workload received from the hardware accelerator in block 1218. Completion of execution of the offloaded workload entirely in I/O coherent mode may signify that cache maintenance operations are unnecessary as a result of the I/O coherent mechanisms of the coherent interconnect managing coherency of the data. While the cache flush maintenance operation may already have executed, no additional overhead may be incurred by the execution of the cache flush maintenance operation, because of the cache flush maintenance operation's execution in parallel with the execution of the offloaded workload while in I/O coherent mode.

In response to determining that the offloaded workload is not completed by the hardware accelerator (i.e., determination block 1212="No"), the processing device may switch the processing device cache and/or the shared memory from an I/O coherent mode to a non-I/O coherent mode in block 1214. The switch from the I/O coherent mode to the non-I/O coherent mode in block 1214 may include setting a state of the I/O coherent mode to "off" or setting a state of the non-I/O coherent mode to "on". The switching from the I/O coherent mode to the non-I/O coherent mode may change the routing of data and memory access requests through the coherent interconnect so that data and requests are no longer routed through the coherent domain and coherency operations are no longer implemented for the data and memory access requests. Rather, the processing device may begin to implement cache maintenance operations in response to the processing device cache and/or the shared memory being set to a non-I/O coherent mode.

In block 1216, the hardware accelerator may continue execute the offloaded workload while the processing device cache and/or the shared memory are/is in a non-I/O coherent mode, as described further herein.

Figure 13:
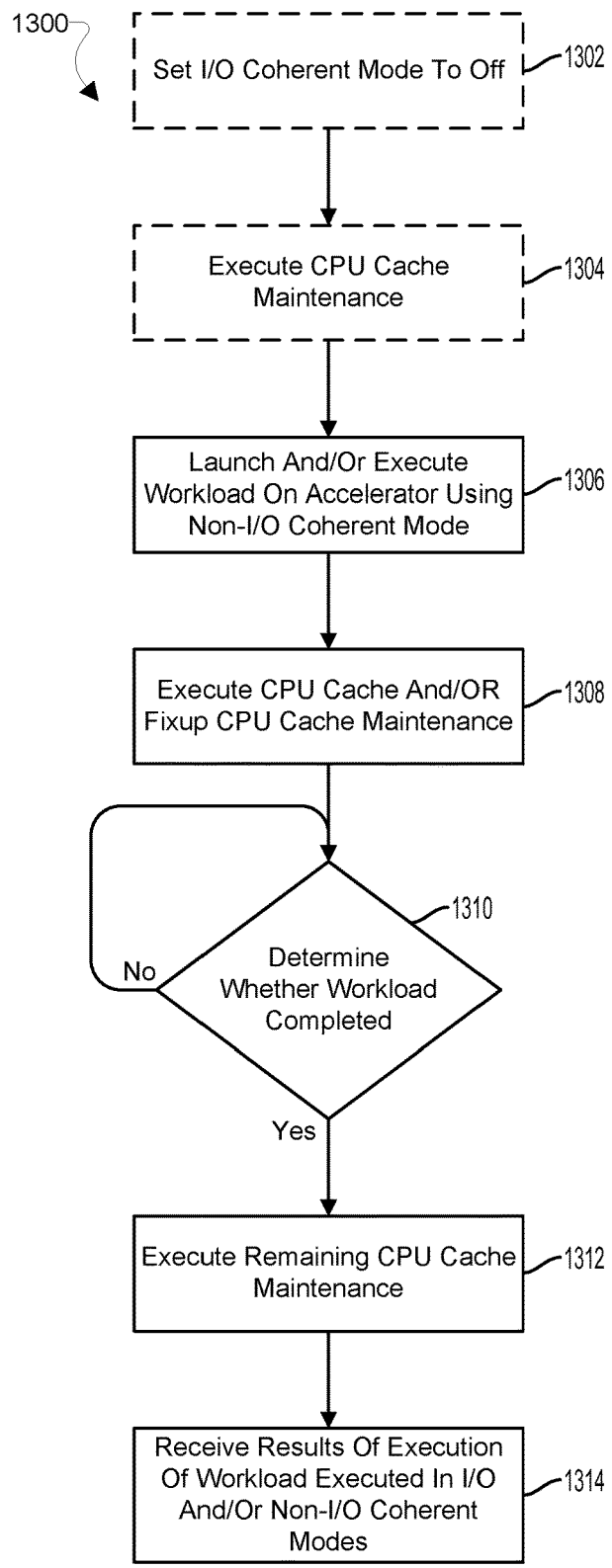
FIG. 13 is a process flow diagram illustrating a method for implementing non-I/O coherent workload processing and/or dynamic I/O coherent workload processing with asynchronous cache maintenance operations according to an aspect.

FIG. 13 illustrates a method 1300 for implementing non-I/O coherent workload processing and/or dynamic I/O coherent workload processing with asynchronous cache maintenance operations according to an aspect. The method 1300 may be implemented in a computing device in software executing in a processor (e.g., the processor 14 in FIGS. 1 and 2 and processing device 302 in FIGS. 3 and 5-10), in general purpose hardware, in dedicated hardware, or in a combination of a software-configured processor and dedicated hardware, such as a processor executing software within a dynamic I/O coherency system (e.g., FIG. 3) and/or an asynchronous cache operation system (e.g., FIG. 4) that includes other individual components. In order to encompass the alternative configurations enabled in the various aspects, the hardware implementing the method 1300 is referred to herein as a "processing device." In various aspects, the method 1300 may be a standalone method for implementing non-I/O coherent workload processing with asynchronous cache maintenance operations, and may further describe the blocks 1214 and 1216 of the method 1200 for implementing dynamic I/O coherent workload processing with asynchronous cache maintenance operations.

In optional block 1302, the processing device may set an I/O coherent mode to "off" for a processing device cache (e.g., processing device cache 308 in FIG. 3 and cache 402 in FIG. 4) and/or a shared memory (e.g., shared memory 304 in FIG. 3). Alternatively, the processing device may set a non-I/O coherent mode to "on" for the processing device cache and/or the shared memory. In various aspects, the I/O coherent mode may have been set to "on" or the non-I/O coherent mode have been set to "on" as a default and/or for executing dynamic I/O coherent workload processing as described in the method 1200.

In optional block 1304, the processing device may execute processing device cache maintenance. As discussed herein, in preparation for offloading the workload in a non-I/O coherent mode, the processing device may execute a cache flush maintenance operation for the processing device cache.

In block 1306, for implementing non-I/O coherent workload processing with asynchronous cache maintenance operations, the processing device may launch an offloaded workload execution on a hardware accelerator (e.g., GPU 306*a*, DSP 306*b*, custom hardware accelerator 306*c* in FIG. 3 and hardware accelerator 306 in FIGS. 5-10). In block 1306, for implementing dynamic I/O coherent workload processing with asynchronous cache maintenance operations, the hardware accelerator may execute the remaining offloaded workload.

In block 1308, the processing device may execute active asynchronous cache maintenance operations from the fixup queue (e.g., the fixup queue 408 in FIG. 4).

In determination block 1310, the processing device may determine whether the offloaded workload is completed by the hardware accelerator.

In response to determining that the offloaded workload is not completed by the hardware accelerator (i.e., determination block 1310="No"), the processing device may continuously determine whether the offloaded workload is completed by the hardware accelerator in determination block 1310. While the offloaded workload is not completed by the hardware accelerator, the hardware accelerator may continue to execute the remaining offloaded workload in block 1306 and execute active asynchronous cache maintenance operations in block 1308. During the execution of the offloaded workload by the hardware accelerator, because the processing device is enabled to execute active asynchronous cache maintenance operations, the remaining workload may incur little to no overhead due to the parallel execution of the active asynchronous cache maintenance operations.

In response to determining that the offloaded workload is completed by the hardware accelerator (i.e., determination block 1310="Yes"), the processing device may execute any remaining active asynchronous cache maintenance operations for the non-I/O coherent mode in block 1312. As discussed herein, to make the results of the execution of the offloaded workload available to the processing device, the processing device may implement a cache invalidate maintenance operation to direct future reads of the processing device cache space to a shared memory (e.g., shared memory 304 in FIG. 3) currently storing the results as a miss after the results are output by the hardware accelerator. The cache invalidate maintenance operation may also create overhead, which may vary depending on the amount of data of the offloaded workload results or the space used in the in the processing device cache to store the offloaded workload results. The overhead may delay the availability of the offloaded workload results for access, use, and/or output by the processing device. However, this delay may be reduced because of parallel and asynchronous execution of the cache invalidate maintenance operation prior to completion of the execution of the offloaded workload.

In block 1314, the processing device may receive the offloaded workload results. The processing device may receive and store the results of the execution of the offloaded workload in the processing device cache.

Figure 14:
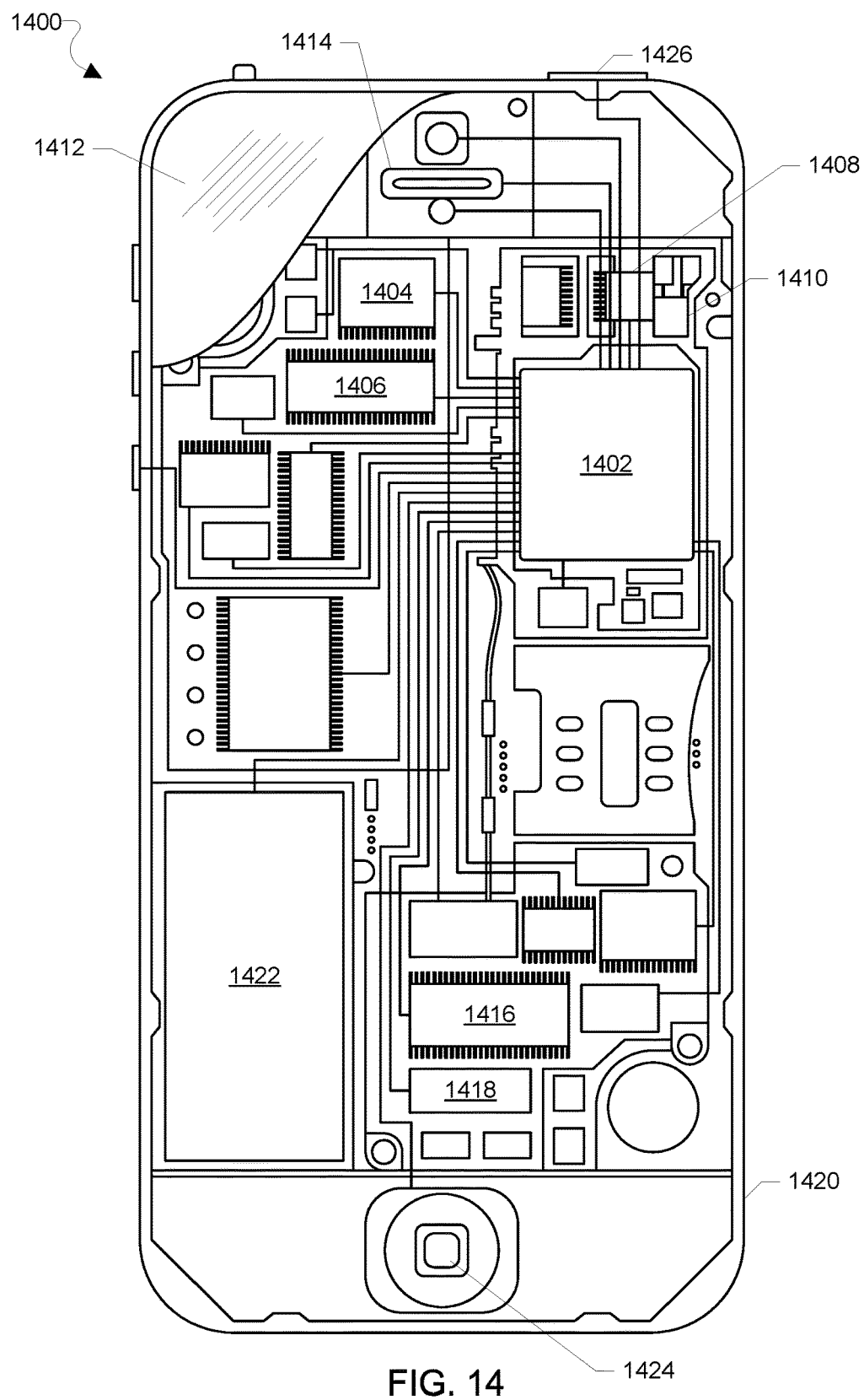
FIG. 14 is a component block diagram illustrating an example mobile computing device suitable for use with the various aspects.

The various aspects (including, but not limited to, aspects described above with reference to FIGS. 1-13) may be implemented in a wide variety of computing systems including mobile computing devices, an example of which suitable for use with the various aspects is illustrated in FIG. 14. The mobile computing device 1400 may include a processor 1402 coupled to a touchscreen controller 1404 and an internal memory 1406. The processor 1402 may be one or more multicore integrated circuits designated for general or specific processing tasks. The internal memory 1406 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1404 and the processor 1402 may also be coupled to a touchscreen panel 1412, such as a resistive-sensing touchscreen, capacitive-sensing touchscreen, infrared sensing touchscreen, etc. Additionally, the display of the computing device 1400 need not have touch screen capability.

The mobile computing device 1400 may have one or more radio signal transceivers 1408 (e.g., Peanut, Bluetooth, ZigBee, Wi-Fi, RF radio) and antennae 1410, for sending and receiving communications, coupled to each other and/or to the processor 1402. The transceivers 1408 and antennae 1410 may be used with the above-mentioned circuitry to implement the various wireless transmission protocol stacks and interfaces. The mobile computing device 1400 may include a cellular network wireless modem chip 1416 that enables communication via a cellular network and is coupled to the processor.

The mobile computing device 1400 may include a peripheral device connection interface 1418 coupled to the processor 1402. The peripheral device connection interface 1418 may be singularly configured to accept one type of connection, or may be configured to accept various types of physical and communication connections, common or proprietary, such as Universal Serial Bus (USB), FireWire, Thunderbolt, or PCIe. The peripheral device connection interface 1418 may also be coupled to a similarly configured peripheral device connection port (not shown).

The mobile computing device 1400 may also include speakers 1414 for providing audio outputs. The mobile computing device 1400 may also include a housing 1420, constructed of a plastic, metal, or a combination of materials, for containing all or some of the components described herein. The mobile computing device 1400 may include a power source 1422 coupled to the processor 1402, such as a disposable or rechargeable battery. The rechargeable battery may also be coupled to the peripheral device connection port to receive a charging current from a source external to the mobile computing device 1400. The mobile computing device 1400 may also include a physical button 1424 for receiving user inputs. The mobile computing device 1400 may also include a power button 1426 for turning the mobile computing device 1400 on and off.

Figure 15:
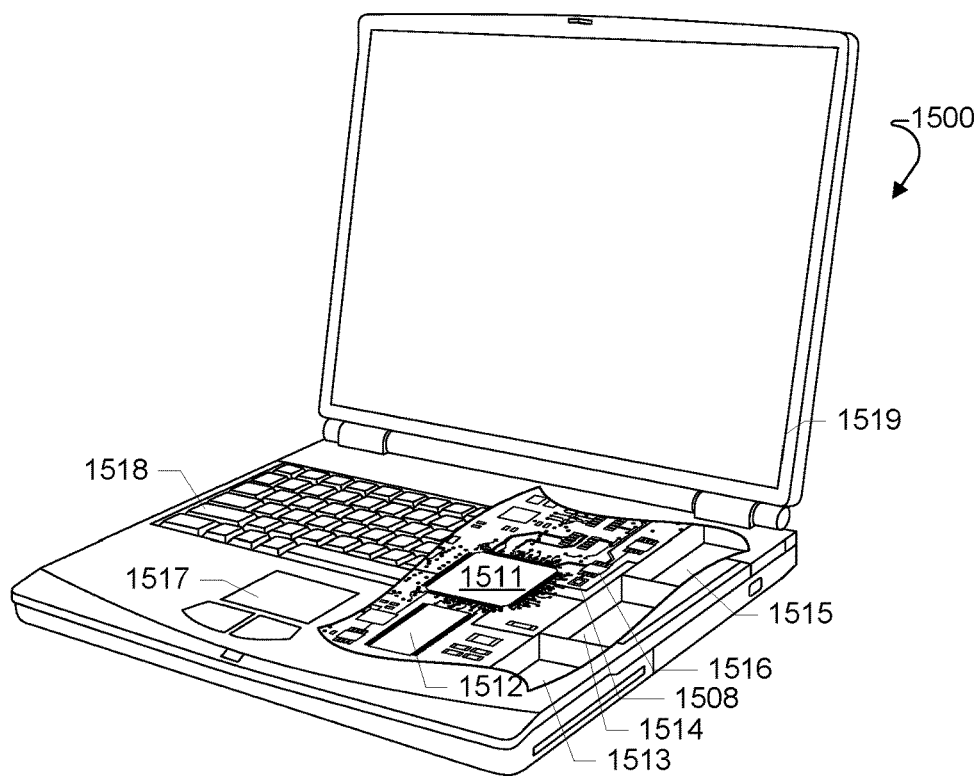
FIG. 15 is a component block diagram illustrating an example mobile computing device suitable for use with the various aspects.

The various aspects (including, but not limited to, aspects described above with reference to FIGS. 1-13) may be implemented in a wide variety of computing systems include a laptop computer 1500 an example of which is illustrated in FIG. 15. Many laptop computers include a touchpad touch surface 1517 that serves as the computer's pointing device, and thus may receive drag, scroll, and flick gestures similar to those implemented on computing devices equipped with a touch screen display and described above. A laptop computer 1500 will typically include a processor 1511 coupled to volatile memory 1512 and a large capacity nonvolatile memory, such as a disk drive 1513 of Flash memory. Additionally, the computer 1500 may have one or more antenna 1508 for sending and receiving electromagnetic radiation that may be connected to a wireless data link and/or cellular telephone transceiver 1516 coupled to the processor 1511. The computer 1500 may also include a floppy disc drive 1514 and a compact disc (CD) drive 1515 coupled to the processor 1511. In a notebook configuration, the computer housing includes the touchpad 1517, the keyboard 1518, and the display 1519 all coupled to the processor 1511. Other configurations of the computing device may include a computer mouse or trackball coupled to the processor (e.g., via a USB input) as are well known, which may also be used in conjunction with the various aspects.

Figure 16:
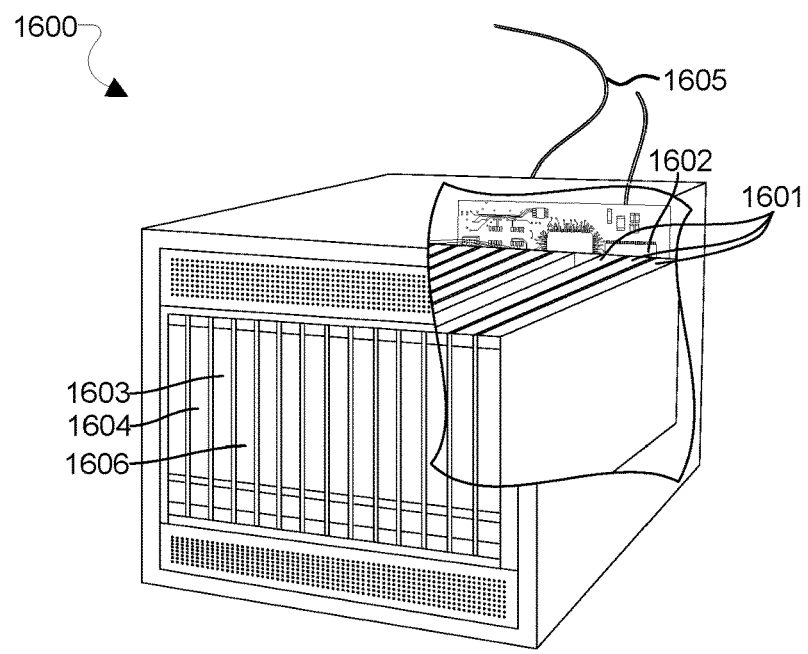
FIG. 16 is a component block diagram illustrating an example server suitable for use with the various aspects.

The various aspects (including, but not limited to, aspects described above with reference to FIGS. 1-13) may also be implemented in fixed computing systems, such as any of a variety of commercially available servers. An example server 1600 is illustrated in FIG. 16. Such a server 1600 typically includes one or more multicore processor assemblies 1601 coupled to volatile memory 1602 and a large capacity nonvolatile memory, such as a disk drive 1604. As illustrated in FIG. 16, multicore processor assemblies 1601 may be added to the server 1600 by inserting them into the racks of the assembly. The server 1600 may also include a floppy disc drive, compact disc (CD) or digital versatile disc (DVD) disc drive 1606 coupled to the processor 1601. The server 1600 may also include network access ports 1603 coupled to the multicore processor assemblies 1601 for establishing network interface connections with a network 1605, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of implementing asynchronous cache maintenance operations on a computing device, comprising:
   activating a first asynchronous cache maintenance operation;
   determining whether an active address of a memory access request to a cache is in a first range of addresses of the first active asynchronous cache maintenance operation, wherein executing the memory access request for the active address in the first range of addresses and executing the first active asynchronous cache maintenance operation concurrently causes a conflict in the cache; and
   queuing the first active asynchronous cache maintenance operation as a queued first asynchronous cache maintenance operation in a fixup queue by storing a first asynchronous cache maintenance operation tag configured to identify the first asynchronous cache maintenance operation and the active address in response to determining that the active address is in the first range of addresses.

2. The method of claim 1, further comprising:
   determining whether to execute the queued first asynchronous cache maintenance operation;
   receiving the queued first asynchronous cache maintenance operation from the fixup queue in response to determining to execute the queued first asynchronous cache maintenance operation;
   activating the first asynchronous cache maintenance operation identified by the queued first asynchronous cache maintenance operation received from the fixup queue;
   executing the first active asynchronous cache maintenance operation; and
   deallocating the first active asynchronous cache maintenance operation upon completion of execution of the first active asynchronous cache maintenance operation.

3. The method of claim 2, wherein determining whether to execute the queued first asynchronous cache maintenance operation comprises determining whether to execute the queued first asynchronous cache maintenance operation based on one of a elapsed time, an elapsed number of operations implemented on a cache line in the first range of addresses for the queued first asynchronous cache maintenance operation, and an idle state of an address for the queued first asynchronous cache maintenance operation.

4. The method of claim 2, wherein executing the first active asynchronous cache maintenance operation comprises executing the first active asynchronous cache maintenance operation in parallel with execution of a workload offloaded from a processing device coupled to the cache on which the first active asynchronous cache maintenance operation is executing.

5. The method of claim 2, further comprising:
determining whether a threshold is exceeded for executing the queued first asynchronous cache maintenance operation;
converting the first asynchronous cache maintenance operation to a synchronous cache maintenance operation;
blocking any memory access request for the first range of addresses; and
executing the synchronous cache maintenance operation.

6. The method of claim 1, further comprising:
activating a second asynchronous cache maintenance operation;
determining whether the active address of the memory access request to the cache is in a second range of addresses of the second active asynchronous cache maintenance operation; and
queuing the second active asynchronous cache maintenance operation as a queued second asynchronous cache maintenance operation by storing a second asynchronous cache maintenance operation tag configured to identify the second asynchronous cache maintenance operation and the active address in response to determining that the active address is in the second range of addresses in the fixup queue.

7. A computing device, comprising:
a cache;
an address range checker;
a fixup queue; and
a cache operation control unit coupled to the cache, the address range checker, and the fixup queue,
wherein the cache operation control unit is configured to perform operations comprising activating a first asynchronous cache maintenance operation,
wherein the address range checker is configured to perform operations comprising determining whether an active address of a memory access request to the cache is in a first range of addresses of the first active asynchronous cache maintenance operation, wherein executing the memory access request for the active address in the first range of addresses and executing the first active asynchronous cache maintenance operation concurrently causes a conflict in the cache, and
wherein the fixup queue is configured to perform operations comprising queuing the first active asynchronous cache maintenance operation as a queued first asynchronous cache maintenance operation by storing a first asynchronous cache maintenance operation tag configured to identify the first asynchronous cache maintenance operation and the active address in response to determining that the active address is in the first range of addresses.

8. The computing device of claim 7, further comprising a walker coupled to the cache operation control unit, the fixup queue, and the cache, and configured to perform operations comprising:
determining whether to execute the queued first asynchronous cache maintenance operation; and
receiving the queued first asynchronous cache maintenance operation from the fixup queue in response to determining to execute the queued first asynchronous cache maintenance operation,
wherein the cache operation control unit is configured to perform operations further comprising activating the first asynchronous cache maintenance operation identified by the queued first asynchronous cache maintenance operation received from the fixup queue,
wherein the walker is configured to perform operations further comprising executing the first active asynchronous cache maintenance operation, and
wherein the cache operation control unit is configured to perform operations further comprising deallocating the first active asynchronous cache maintenance operation upon completion of execution of the first active asynchronous cache maintenance operation.

9. The computing device of claim 8, wherein the walker is configured to perform operations such that determining whether to execute the queued first asynchronous cache maintenance operation comprises determining whether to execute the queued first asynchronous cache maintenance operation based on one of a elapsed time, an elapsed number of operations implemented on a cache line in the first range of addresses for the queued first asynchronous cache maintenance operation, and an idle state of an address for the queued first asynchronous cache maintenance operation.

10. The computing device of claim 8, further comprising a processing device coupled to the cache,
wherein the walker is configured to perform operations such that executing the first active asynchronous cache maintenance operation comprises executing the first active asynchronous cache maintenance operation in parallel with execution of a workload offloaded from the processing device coupled to the cache on which the first active asynchronous cache maintenance operation is executing.

11. The computing device of claim 8, wherein:
the walker is configured to perform operations further comprising determining whether a threshold is exceeded for executing the queued first asynchronous cache maintenance operation;
the cache operation control unit is configured to perform operations further comprising:
converting the first asynchronous cache maintenance operation to a synchronous cache maintenance operation; and
blocking any memory access request for the first range of addresses; and
the walker is configured to perform operations further comprising executing the synchronous cache maintenance operation.

12. The computing device of claim 7, wherein:
the cache operation control unit is configured to perform operations further comprising activating a second asynchronous cache maintenance operation;
the address range checker is configured to perform operations further comprising determining whether the active address of the memory access request to the cache is in a second range of addresses of the second active asynchronous cache maintenance operation; and
the fixup queue is configured to perform operations further comprising queuing the second active asynchronous cache maintenance operation as a queued second asynchronous cache maintenance operation by storing a second asynchronous cache maintenance operation tag configured to identify the second asynchronous cache maintenance operation and the active address in response to determining that the active address is in the second range of addresses in the fixup queue.

13. A computing device, comprising:
a cache;
a fixup queue;
means for activating a first asynchronous cache maintenance operation;

means for determining whether an active address of a memory access request to the cache is in a first range of addresses of the first active asynchronous cache maintenance operation, wherein executing the memory access request for the active address in the first range of addresses and executing the first active asynchronous cache maintenance operation concurrently causes a conflict in the cache; and means for queuing the first active asynchronous cache maintenance operation as a queued first asynchronous cache maintenance operation in the fixup queue by storing a first asynchronous cache maintenance operation tag configured to identify the first asynchronous cache maintenance operation and the active address in response to determining that the active address is in the first range of addresses.

14. The computing device of claim 13, further comprising:

means for determining whether to execute the queued first asynchronous cache maintenance operation;

means for receiving the queued first asynchronous cache maintenance operation from the fixup queue in response to determining to execute the queued first asynchronous cache maintenance operation;

means for activating the first asynchronous cache maintenance operation identified by the queued first asynchronous cache maintenance operation received from the fixup queue;

means for executing the first active asynchronous cache maintenance operation; and means for deallocating the first active asynchronous cache maintenance operation upon completion of execution of the first active asynchronous cache maintenance operation.

15. The computing device of claim 14, wherein means for determining whether to execute the queued first asynchronous cache maintenance operation comprises means for determining whether to execute the queued first asynchronous cache maintenance operation based on one of a elapsed time, an elapsed number of operations implemented on a cache line in the first range of addresses for the queued first asynchronous cache maintenance operation, and an idle state of an address for the queued first asynchronous cache maintenance operation.

16. The computing device of claim 14, further comprising a processing device, wherein means for executing the first active asynchronous cache maintenance operation comprises means for executing the first active asynchronous cache maintenance operation in parallel with execution of a workload offloaded from the processing device coupled to the cache on which the first active asynchronous cache maintenance operation is executing.

17. The computing device of claim 14, further comprising:

means for determining whether a threshold is exceeded for executing the queued first asynchronous cache maintenance operation;

means for converting the first asynchronous cache maintenance operation to a synchronous cache maintenance operation;

means for blocking any memory access request for the first range of addresses; and means for executing the synchronous cache maintenance operation.

18. The computing device of claim 13, further comprising:

means for activating a second asynchronous cache maintenance operation;

means for determining whether the active address of the memory access request to the cache is in a second range of addresses of the second active asynchronous cache maintenance operation; and means for queuing the second active asynchronous cache maintenance operation as a queued second asynchronous cache maintenance operation by storing a second asynchronous cache maintenance operation tag configured to identify the second asynchronous cache maintenance operation and the active address in response to determining that the active address is in the second range of addresses in the fixup queue.

19. A non-transitory processor-readable medium having stored thereon processor-executable instructions configured to cause a processing device of a computing device to perform operations comprising:

activating a first asynchronous cache maintenance operation;

determining whether an active address of a memory access request to a cache is in a first range of addresses of the first active asynchronous cache maintenance operation, wherein executing the memory access request for the active address in the first range of addresses and executing the first active asynchronous cache maintenance operation concurrently causes a conflict in the cache; and queuing the first active asynchronous cache maintenance operation as a queued first asynchronous cache maintenance operation in a fixup queue by storing a first asynchronous cache maintenance operation tag configured to identify the first asynchronous cache maintenance operation and the active address in response to determining that the active address is in the first range of addresses.

20. The non-transitory processor-readable medium of claim 19, wherein the stored executable instructions are configured to cause the processing device of the computing device to perform operations further comprising:

determining whether to execute the queued first asynchronous cache maintenance operation;

receiving the queued first asynchronous cache maintenance operation from the fixup queue in response to determining to execute the queued first asynchronous cache maintenance operation;

activating the first asynchronous cache maintenance operation identified by the queued first asynchronous cache maintenance operation received from the fixup queue;

executing the first active asynchronous cache maintenance operation; and deallocating the first active asynchronous cache maintenance operation upon completion of execution of the first active asynchronous cache maintenance operation.

21. The non-transitory processor-readable medium of claim 20, wherein the stored executable instructions are configured to cause the processing device of the computing device to perform operations such that determining whether to execute the queued first asynchronous cache maintenance operation comprises determining whether to execute the queued first asynchronous cache maintenance operation based on one of a elapsed time, an elapsed number of operations implemented on a cache line in the first range of addresses for the queued first asynchronous cache maintenance operation, and an idle state of an address for the queued first asynchronous cache maintenance operation.

22. The non-transitory processor-readable medium of claim 20, wherein the stored executable instructions are configured to cause the processing device of the computing device to perform operations such that executing the first active asynchronous cache maintenance operation comprises executing the first active asynchronous cache maintenance operation in parallel with execution of a workload offloaded from a processing device having the cache on which the first active asynchronous cache maintenance operation is executing.

23. The non-transitory processor-readable medium of claim 20, wherein the stored executable instructions are configured to cause the processing device of the computing device to perform operations further comprising:
    determining whether a threshold is exceeded for executing the queued first asynchronous cache maintenance operation;
    converting the first asynchronous cache maintenance operation to a synchronous cache maintenance operation;
    blocking any memory access request for the first range of addresses; and
    executing the synchronous cache maintenance operation.

24. The non-transitory processor-readable medium of claim 19, wherein the stored executable instructions are configured to cause the processing device of the computing device to perform operations further comprising:
    activating a second asynchronous cache maintenance operation;
    determining whether the active address of the memory access request to the cache is in a second range of addresses of the second active asynchronous cache maintenance operation; and
    queuing the second active asynchronous cache maintenance operation as a queued second asynchronous cache maintenance operation by storing a second asynchronous cache maintenance operation tag configured to identify the second asynchronous cache maintenance operation and the active address in response to determining that the active address is in the second range of addresses in the fixup queue.

* * * * *